(12) United States Patent
Nishimura et al.

(10) Patent No.: US 9,902,435 B2
(45) Date of Patent: Feb. 27, 2018

(54) STRUCTURAL MEMBER FOR AUTOMOTIVE BODY

(71) Applicant: NIPPON STEEL & SUMITOMO METAL CORPORATION, Tokyo (JP)

(72) Inventors: Ryuichi Nishimura, Tokyo (JP); Kenichiro Otsuka, Tokyo (JP); Yasuhiro Ito, Tokyo (JP); Yoshiaki Nakazawa, Tokyo (JP)

(73) Assignee: NIPPON STEEL & SUMITOMO METAL CORPORATION, Tokyo (JP)

( * ) Notice: Subject to any disclaimer, the term of this patent is extended or adjusted under 35 U.S.C. 154(b) by 0 days.

(21) Appl. No.: 14/913,819

(22) PCT Filed: Sep. 30, 2014

(86) PCT No.: PCT/JP2014/075975
§ 371 (c)(1),
(2) Date: Feb. 23, 2016

(87) PCT Pub. No.: WO2015/053125
PCT Pub. Date: Apr. 16, 2015

(65) Prior Publication Data
US 2016/0280282 A1 Sep. 29, 2016

(30) Foreign Application Priority Data
Oct. 9, 2013 (JP) .................. 2013-212071

(51) Int. Cl.
*B62D 25/20* (2006.01)
*B62D 27/02* (2006.01)
*B62D 29/00* (2006.01)

(52) U.S. Cl.
CPC ............ *B62D 25/20* (2013.01); *B62D 27/02* (2013.01); *B62D 27/026* (2013.01); *B62D 29/007* (2013.01)

(58) Field of Classification Search
CPC ...... B62D 25/20; B62D 27/02; B62D 27/026; B62D 29/007
See application file for complete search history.

(56) References Cited

U.S. PATENT DOCUMENTS 6,209,948 B1    4/2001   Mori et al.
8,870,204 B2 * 10/2014   Buschjohann ....... B60G 21/051
                                            280/124.128
(Continued)

FOREIGN PATENT DOCUMENTS

CN    1083783 C    5/2002
CN    1856672 A    11/2006
(Continued)

OTHER PUBLICATIONS

Taiwanese Office Action and Search Report, dated Nov. 16, 2016, for Taiwanese Application No. 103134873, with a partial English Translation.
(Continued)

*Primary Examiner* — Pinel E Romain
(74) *Attorney, Agent, or Firm* — Birch, Stewart, Kolasch & Birch, LLP

(57) ABSTRACT

Provided is a structural member for an automotive body, which is excellent in load transfer capability and rigidity by effectively enhancing energy absorption efficiency provided by disposing a groove in the structural member having a substantially gutter-shaped cross section and a groove in the top plate.
The structural member for an automotive body, the structural member consisting of a press-formed product made of a steel sheet, the press-formed product extending in a predetermined direction, including a top plate, a ridge continuing to the top plate, and a vertical wall continuing to the ridge, and having a substantially gutter-shaped cross section intersecting the predetermined direction, includes at least one (Continued)

groove formed in the top plate, and extending in the predetermined direction, and an outward flange formed at least in a region of the ridge in an end in the predetermined direction. The groove having a depth set according to a width of the groove and a sheet thickness of the steel sheet.

8 Claims, 24 Drawing Sheets

(56) References Cited

U.S. PATENT DOCUMENTS

| | | | |
|---|---|---|---|
| 9,505,361 B2* | 11/2016 | Conrod | B21B 15/0007 |
| 2006/0202493 A1 | 9/2006 | Tamura et al. | |
| 2009/0188100 A1 | 7/2009 | Durney et al. | |
| 2010/0327628 A1 | 12/2010 | Taguchi | |
| 2011/0127783 A1 | 6/2011 | Shimotsu et al. | |
| 2012/0153676 A1* | 6/2012 | Shono | B62D 25/04 |
| | | | 296/193.06 |
| 2015/0042129 A1* | 2/2015 | Cho | B62D 25/08 |
| | | | 296/203.04 |
| 2016/0137046 A1* | 5/2016 | Song | B60K 1/04 |
| | | | 180/68.5 |

FOREIGN PATENT DOCUMENTS

| | | |
|---|---|---|
| CN | 101164819 A | 4/2008 |
| CN | 101778755 A | 7/2010 |
| DE | 102012020447 A1 | 4/2013 |
| EP | 0172606 A1 | 2/1986 |
| EP | 0637538 A1 | 2/1995 |
| EP | 1908668 A1 | 4/2008 |
| JP | 6-166384 A | 6/1994 |
| JP | 10-226307 A | 8/1998 |
| JP | 2004-181502 A | 7/2004 |
| JP | 2009-286351 A | 12/2009 |
| JP | 2011-178179 A | 9/2011 |
| RU | 2 096 232 C1 | 11/1997 |
| RU | 71 312 U1 | 3/2008 |
| RU | 72 453 U1 | 4/2008 |
| RU | 2 459 875 C1 | 8/2012 |
| TW | 2009-40388 | 12/1997 |
| WO | WO 2005/010398 A1 | 2/2005 |

OTHER PUBLICATIONS

International Search Report (PCT/ISA/210) issued in PCT/JP2014/075975, dated Dec. 9, 2014.
Written Opinion (PCT/ISA/237) issued in PCT/JP2014/075975, dated Dec. 9, 2014.
Taiwanese Office Action dated Mar. 28, 2016 issued in Taiwanese Patent Application No. 103134873.
Korean Office Action, dated Jul. 12, 2017, for corresponding Korean Application No. 10-2016-7005857, with a partial English translation.
Chinese Office Action and Search Report, dated Feb. 24, 2017, for corresponding Chinese Application No. 201480054749,2, with an English translation of the Office Action.
Korean Office Action and English translation thereof, dated Feb. 24, 2017, for corresponding Korean Application No. 10-2016-7005857.
Russian Office Action and Search Report, dated May 18, 2017, for Russian Application No. 2016112332 with English translations.
Extended European Search Report, dated Jul. 7, 2017, for corresponding European Application No. 14852343.4.
Chinese Office Action and Search Report dated Nov. 3, 2017, for corresponding Chinese Application No. 201480054749.2, including a partial English translation of the Chinese Office Action.

* cited by examiner (a)

(b)

(a)

(b)

(a) CROSS SECTION 1

(b) CROSS SECTION 2

(c) LONGITUDINAL SECTION (a)

(b)

(a)

(b)

(a)

(b)

(c)

(a) COMPARATIVE EXAMPLE 2

(b) EXAMPLE (a)
COMPARATIVE
EXAMPLE 2

(b)
EXAMPLE

COMPARATIVE EXAMPLE 2

(a) 10mm (b) 20mm (c) 30mm (d) 40mm (e) 50mm

EXAMPLE (a) 10mm (b) 20mm (c) 30mm (d) 40mm (e) 50mm

STRUCTURAL MEMBER FOR AUTOMOTIVE BODY

TECHNICAL FIELD

The present invention relates to a structural member for an automotive body, and more particularly to a structural member for an automotive body obtained by press forming a forming material made of a steel sheet.

BACKGROUND ART

An automotive body includes major structural members such as vehicle longitudinal members that are disposed along a vehicle front-back direction and vehicle widthwise members that are disposed along a vehicle widthwise direction. The vehicle longitudinal members and the vehicle widthwise members are joined, in the way that one type of members have flanges formed at the ends and are joined to the other type of members via the flanges, to ensure rigidity required for the automotive body and bear the load in case of a collision event.

The structural members such as the vehicle lengthwise members and the vehicle widthwise members are required to have properties such as high load transfer capability in the axial direction, high flexural rigidity, and high torsional rigidity. High load transfer capability in the axial direction means that deformation is small when the load acts in the axial direction. High flexural rigidity means that deformation is small against the bending moment when the longitudinal axis of the member is bent, and high torsional rigidity means that the angle of torsion is small against the torsional moment when the member is twisted around the longitudinal axis of the member. In recent years, a high tension steel sheet having a tensile strength of 390 MPa or more (a high-strength steel sheet or a high-tensile steel sheet) has tended to be used as a material for the structural member in an aim to reduce vehicle weight and improve collision safety.

For example, a floor cross member, which is used to reinforce the floor of an automotive body, has a cross section substantially shaped like a gutter and is joined to vehicle longitudinal members such as side sills via outward flanges formed at both ends of the floor cross member. It is important for the floor cross member to have an increased joining strength to other members and an increased rigidity to ensure the rigidity of an automotive body and better load transfer capability when an impact load is applied. Accordingly, it is necessary not only to increase the material strength but to modify the shape of the member so as to improve the load transfer capability and the rigidity when an impact load is applied.

Patent Literature 1 discloses a structural member for an automotive body manufactured by press forming. The structural member has a substantially gutter-shaped cross section as a whole and a groove-like depression in the hat top that is a part corresponding to the bottom in the gutter-shaped cross section.

PRIOR ART LITERATURE(S)

Patent Literature(s)

[Patent Literature 1] JP 2004-181502A

SUMMARY OF THE INVENTION

Problem(s) to Be Solved by the Invention

When a groove-like depression (hereinafter referred to as simply "groove") is provided in the hat top as in the structural member for an automotive body disclosed in Patent Literature 1, it is likely that the number of load-bearing ridgelines increases, and thus the amount of energy absorption by the press-formed product is increased. However, there have been cases in which energy absorption efficiency has not been improved by simply forming the groove in a top plate in the structural member having a substantially gutter-shaped cross section.

FIG. 24 shows a state in which a structural member having a substantially gutter-shaped cross section with a groove formed in a top plate deforms by receiving an impact load in the axial direction. FIG. 24 shows that the structural member deforms at each displacement stroke. This structural member has the groove in the top plate but does not have an outward flange in the region along each ridge in the longitudinal end, as illustrated in FIG. 15(c). As illustrated in FIG. 24, even though the structural member had the groove, there were cases in which the structural member buckled downward, in other words, buckled toward the opening of the substantially gutter-shaped cross section where the rigidity of shape was relatively small, as the displacement stroke became larger due to receiving a higher impact load. If the structural member is buckled, the energy absorption stops increasing.

An object of the present invention is to provide a structural member for an automotive body that is excellent in load transfer capability and rigidity by effectively enhancing energy absorption efficiency provided by disposing a groove in a top plate in the structural member having a substantially gutter-shaped cross section.

Means for Solving the Problem(s)

To solve the problem, according to an aspect of the present invention, there is provided a structural member for an automotive body, the structural member consisting of a press-formed product made of a steel sheet, the press-formed product extending in a predetermined direction, including a top plate, a ridge continuing to the top plate, and a vertical wall continuing to the ridge, and having a substantially gutter-shaped cross section intersecting the predetermined direction, the structural member including: at least one groove formed in the top plate, and extending in the predetermined direction; and an outward flange formed at least in a region of the ridge in an end in the predetermined direction. The groove having a depth set according to a width of the groove and a sheet thickness of the steel sheet.

The depth (h) of the groove, the width (w) of the groove, and the sheet thickness (t) of the steel sheet in the end in the predetermined direction may satisfy a relation: $0.2 \times H_0 < h < 3.0 \times H_0$, where $H_0 = (0.037t - 0.25) \times w - 5.7t + 29.2$.

The steel sheet may be a high-tensile steel sheet having a tensile strength of 390 MPa or more.

The steel sheet may be a high-tensile steel sheet having a tensile strength of 590 MPa or more.

The steel sheet may be a high-tensile steel sheet having a tensile strength of 980 MPa or more.

The outward flange may be an outward continuous flange continuously formed in a region over the ridge and at least a part of each of the top plate and the vertical wall, in the end in the predetermined direction.

The structural member may include the outward flange in a region of the groove in the end in the predetermined direction.

The structural member for an automotive body may be joined to another member via the outward flange by resistance spot welding, penetration laser welding, arc fillet welding, adhesion with an adhesive, or a combination thereof.

Effect(s) of the Invention

According to the present invention, the structural member having the outward flange in at least the end of the ridge enhances energy absorption in the initial stage of collision. In addition, the structural member having the groove in the top plate and the outward flange at least in the end of the ridge restrains buckling of the structural member in the middle and later stage of collision, and thus enhances the energy absorption effect provided by disposing the groove.

In addition, the structural member according to the present invention having the outward flange at least in the end of the ridge can provide a groove having an effective depth according to the groove width and the sheet thickness. Accordingly, it becomes easier to form a groove having a desired depth that allows the energy absorption efficiency to improve, even in press forming the high-tensile steel sheet that is relatively difficult for press forming. As a result, a structural member having excellent load transfer capability and rigidity can be obtained with a high production yield.

Moreover, the structural member according to the present invention, which has the outward flange at least in the region of the ridge in the end, enables joining to other members via the outward flange or the flange in the vicinity thereof. Consequently, this further improves load transfer capability and rigidity.

BRIEF DESCRIPTION OF THE DRAWING(S)

FIGS. 8(a) and 8(b) are a plan view and a view from above in the axial direction of a structural member used in Analysis 1, respectively.

Figure 9:
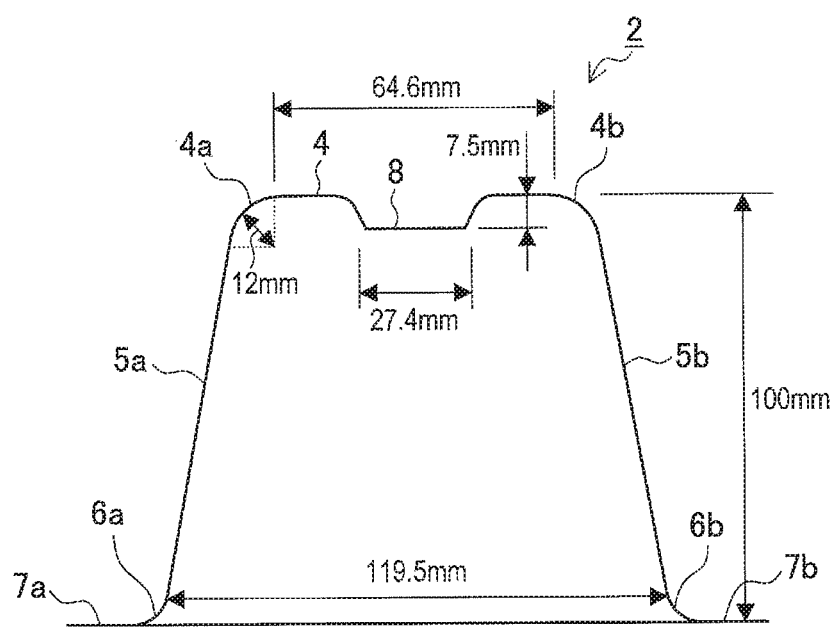

FIG. 9 is a schematic view showing dimensions of a structural member used in Analysis 1.

Figure 10:
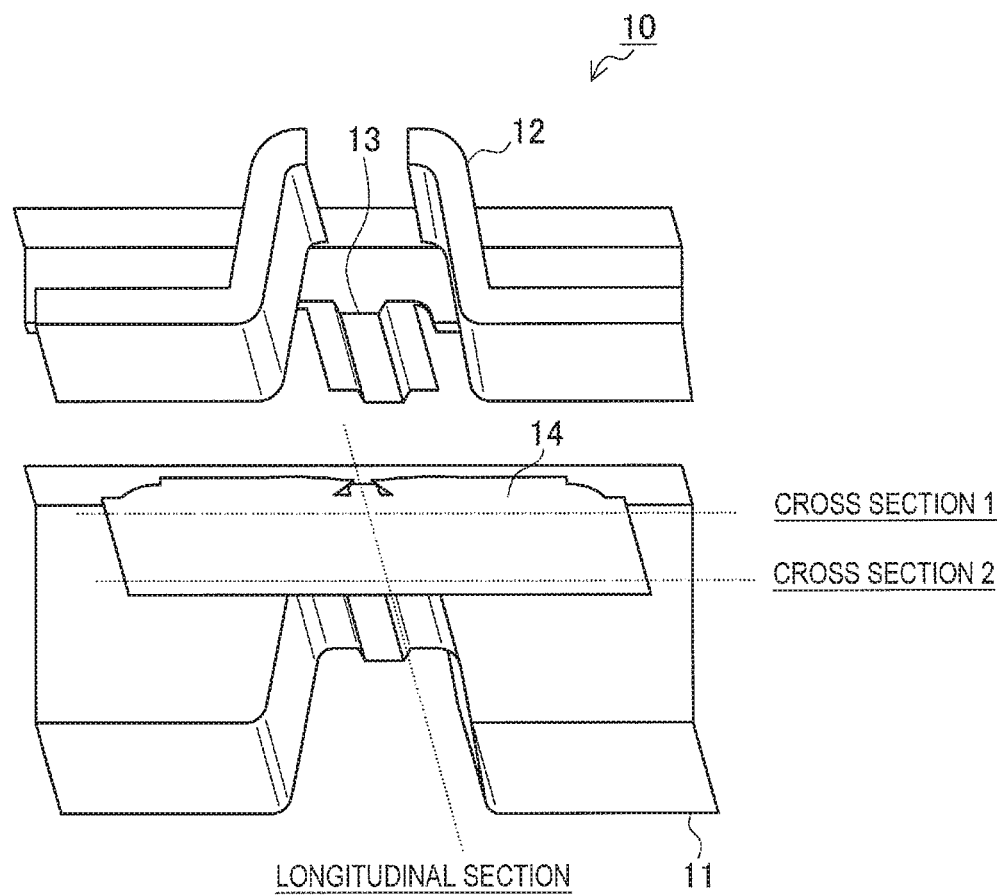

FIG. 10 is a perspective view illustrating a press-forming apparatus used in first press forming in Analysis 1.

Figure 11:
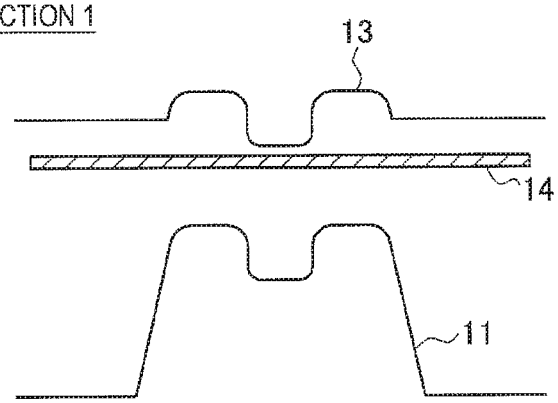
Figure 11:
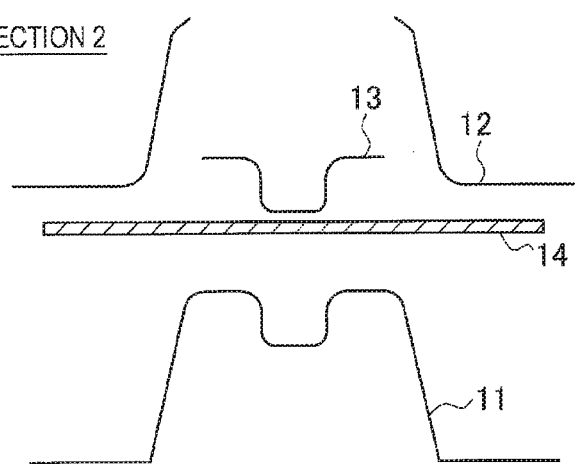
Figure 11:
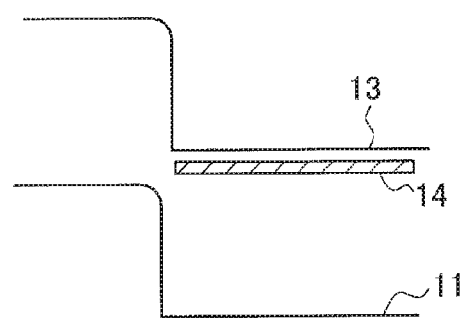

FIG. 11 is a schematic view illustrating first press forming in Analysis 1.

Figure 12:
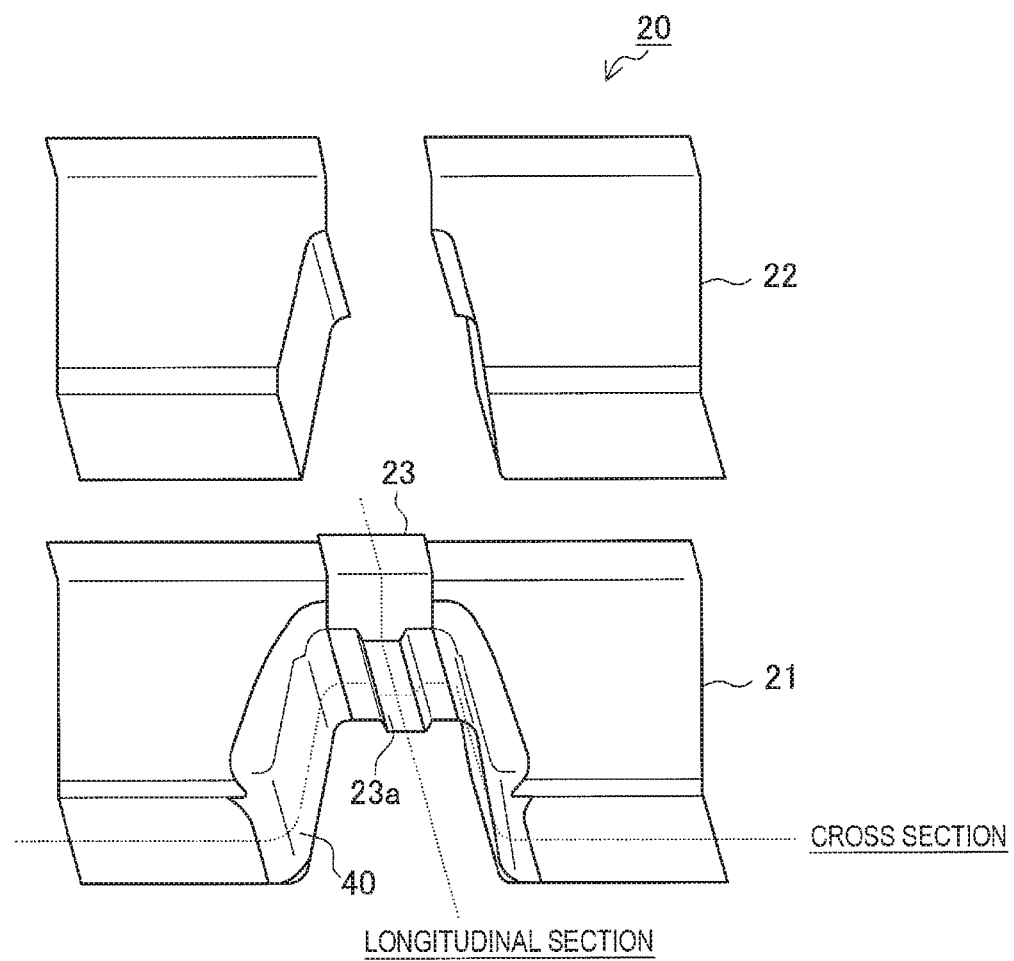

FIG. 12 is a perspective view illustrating a press-forming apparatus used in a second press forming in Analysis 1.

Figure 13:
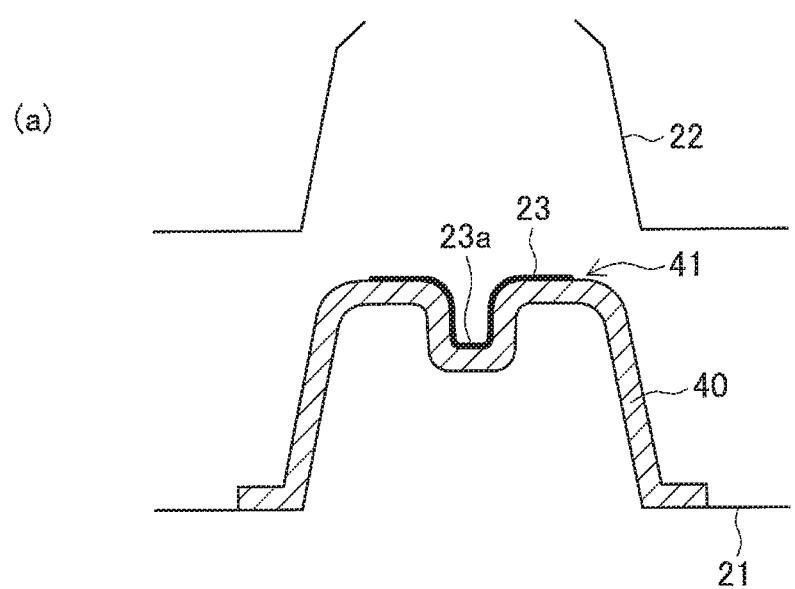
Figure 13:
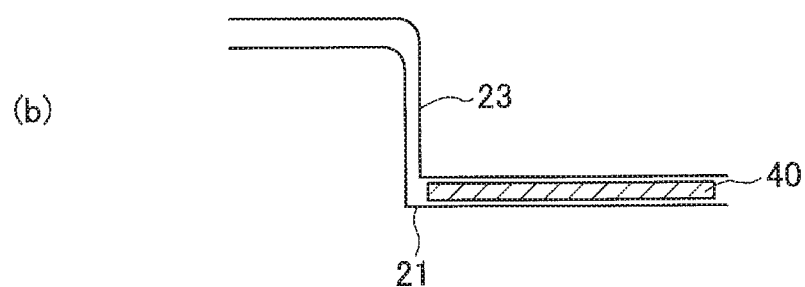

FIG. 13 is a schematic view illustrating second press forming in Analysis 1.

FIGS. 14(a) and 14(b) are schematic views illustrating an intermediate product and a structural member, respectively, which show a maximum decrease rate of sheet thickness in the vicinity of the edge of a ridge flange and a minimum decrease rate of sheet thickness near the base of a ridge flange.

FIG. 15(a) is a front elevational view illustrating an analytical model for a structural member according to the present embodiment, used in Analysis 2, and FIG. 15(b) is a front elevational view illustrating an analytical model for Comparative Example 1. FIG. 15(c) is a front elevational view illustrating an analytical model for Comparative Example 2.

Figure 16:
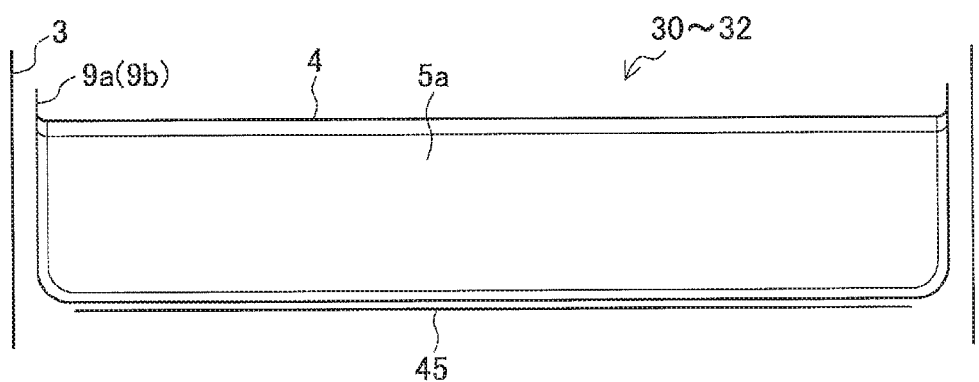

FIG 16 is a side view illustrating a shape of each analytical model used in Analysis 2.

Figure 17:
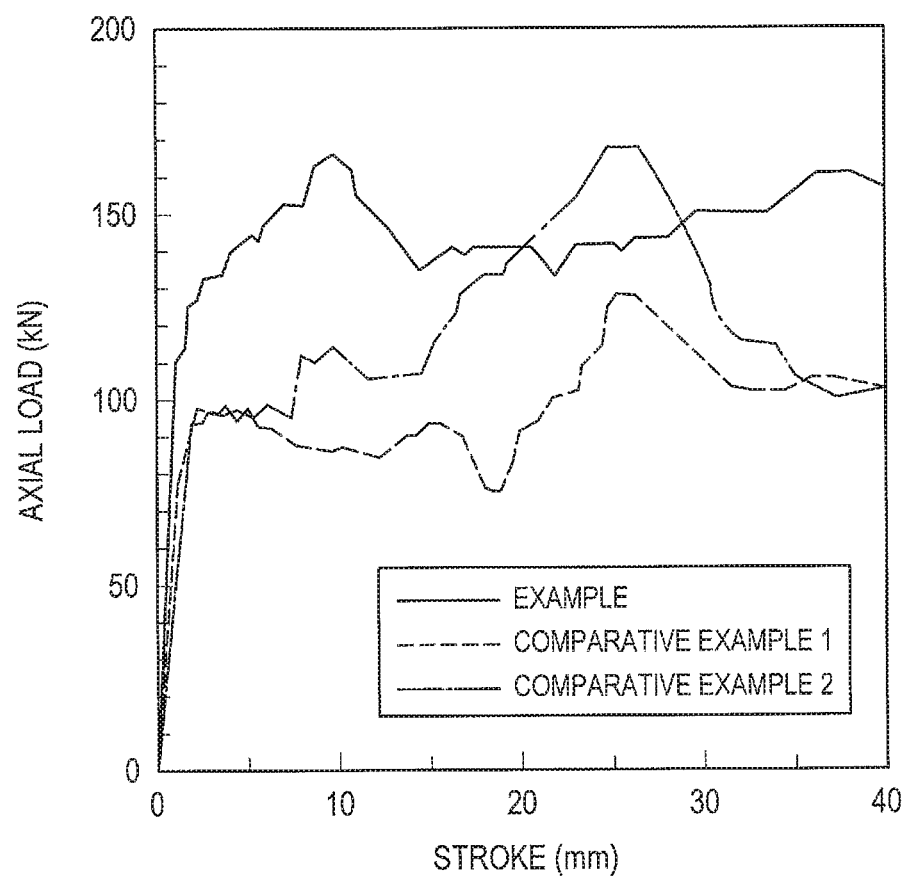

FIG. 17 is a graph showing axial load vs. stroke characteristics obtained from Analysis 2.

Figure 18:
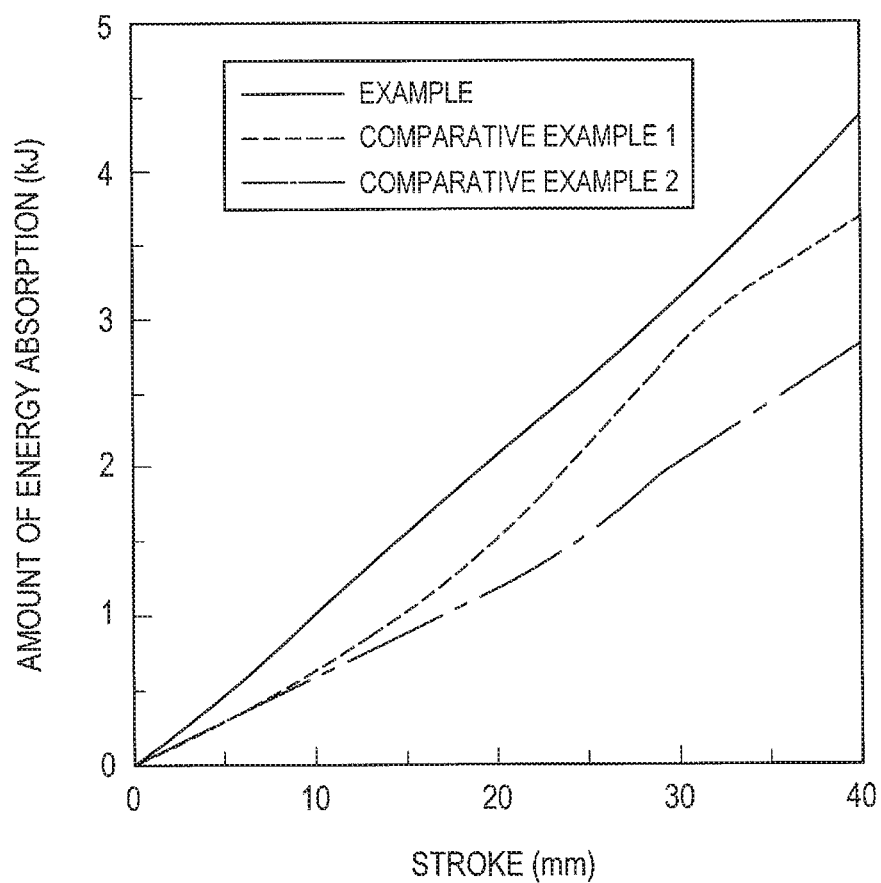

FIG. 18 is a graph showing amount of energy absorption vs. stroke characteristics obtained from Analysis 2.

FIG. 19(a) is a graph showing amount of energy absorption vs. stroke characteristics for an analytical model of Comparative Example 2, obtained from Analysis 3 using a steel sheet of 340 HR, and FIG. 19(b) is a graph showing amount of energy absorption vs. stroke characteristics for an analytical model of a structural member according to the present embodiment, obtained from Analysis 3 using a steel sheet of 340 HR.

Figure 20:
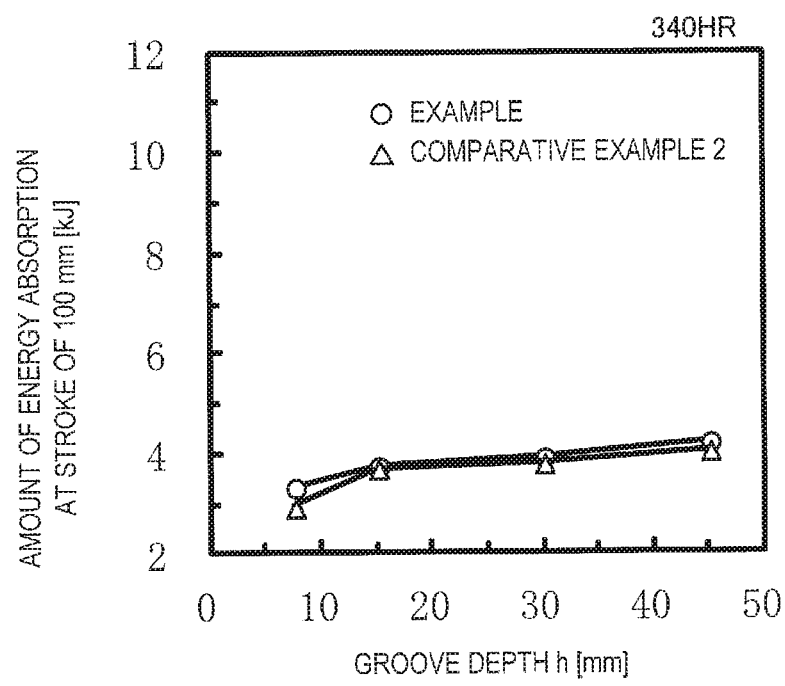

FIG. 20 is a graph showing amount of energy absorption vs. groove depth characteristics obtained from Analysis 3 using a steel sheet of 340 HR.

FIG. 21(a) is a graph showing amount of energy absorption vs. stroke characteristics for an analytical model of Comparative Example 2, obtained from Analysis 3 using a steel sheet of 980Y, and FIG. 21(b) is a graph showing amount of energy absorption vs. stroke characteristics for an analytical model of a structural member according to the present embodiment, obtained from Analysis 3 using a steel sheet of 980 Y.

Figure 22:
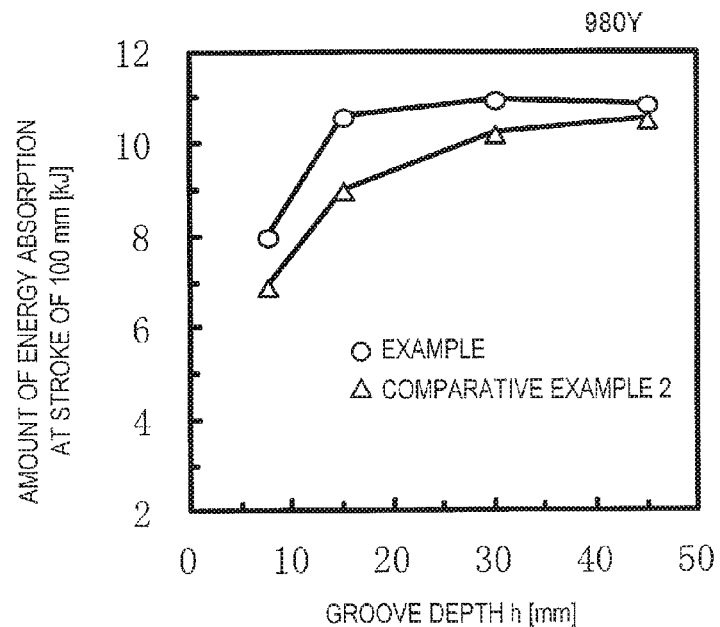

FIG. 22 is a graph showing amount of energy absorption vs. groove depth characteristics obtained from Analysis 3 using a steel sheet of 980 Y.

Figure 23:
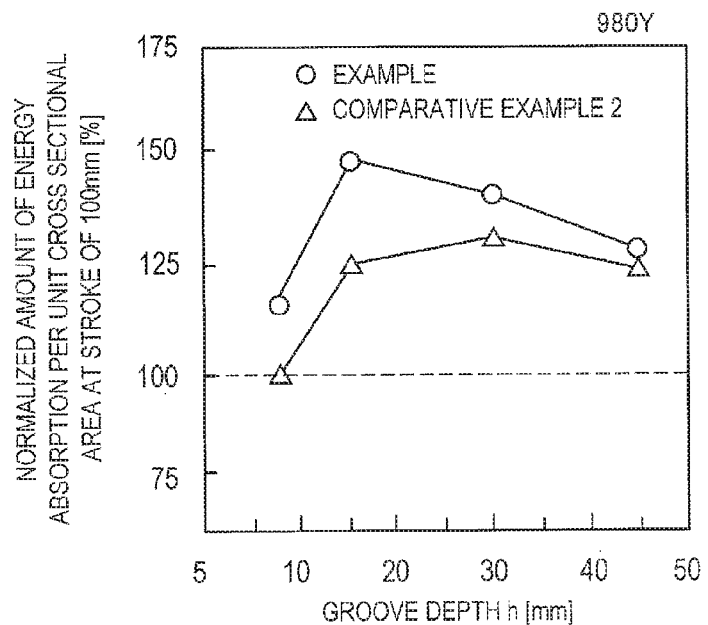

FIG. 23 is a graph showing normalized amount of energy absorption vs. groove depth characteristics obtained from Analysis 3.

FIGS. 24(a) to 24(e) are schematic views illustrating deformation of an analytical model of Comparative Example 2.

FIGS. 25(a) to 25(e) are schematic views illustrating deformation of an analytical model of a structural member according to the present embodiment.

MODE(S) FOR CARRYING OUT THE INVENTION

Hereinafter, (a) preferred embodiment(s) of the present disclosure will be described in detail with reference to the appended drawings. In this specification and the appended drawings, structural elements that have substantially the same function and structure are denoted with the same reference numerals, and repeated explanation of these structural elements is omitted.

<1. Structural Member for Automotive Body>
1-1. (Structural Example)

Figure 1:
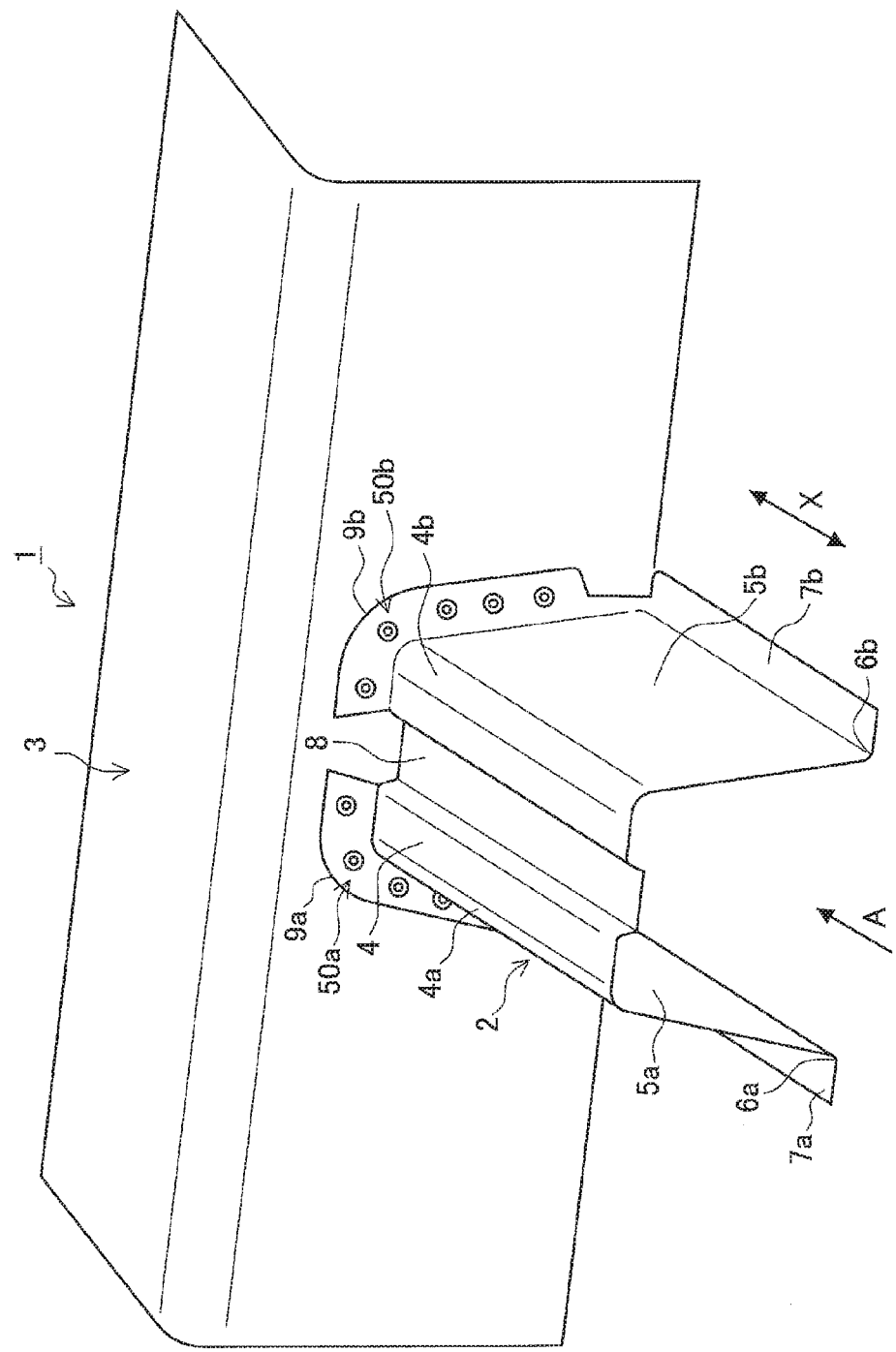
FIG. 1 is a perspective view illustrating a shape of a structural member according to an embodiment of the present invention.

FIG. 1 is a schematic view illustrating an exemplary structural member (first member) 2 for an automotive body according to the present embodiment. FIG. 2(a) is a view on the arrow A in FIG. 1, which is the view in the axial direction of the structural member (first member) 2 according to the present embodiment.

A first member 2 is joined to a second member 3 to constitute a joined structure 1. The first member 2 is a press-formed product made of a steel sheet and extends in a predetermined direction (or referred to as an axial direction) as designated by the arrow X in FIG. 1. The first member 2 is joined at the axial end to, for example, a second member 3 that is also a press-formed product made of steel sheet, via outward continuous flanges 9a, 9b by, for example, spot welding. For example, the first member 2 is joined to the second member 3 by using resistance spot welding, penetration laser welding, arc fillet welding, or the combination thereof. Joining the first member 1 to the second member 3 may be achieved by adhesion using an adhesive or by the combination of welding and adhesion. The first member 2 is a long member having a longitudinal length of, for example, 100 mm or more, preferably 200 mm or more, and more preferably 300 mm or more. The first member 2 illustrated in FIG. 1 has the predetermined direction that corresponds to the longitudinal direction, but the predetermined direction is not limited to the longitudinal direction of the first member 2.

As a forming material for the first member 2, a high-tensile steel sheet having, for example, a thickness ranging from 0.5 to 6.0 mm and a tensile strength of 390 MPa or more measured by tensile testing in accordance with JIS Z 2241 can be used. Preferably, a 2.0 mm or less thick high-tensile steel sheet having a tensile strength of 440 MPa or more can be used as the forming material for the first member 2. Incidentally, an upper limit of tensile strength, which is not particularly specified here, is, for example, about 1770 MPa and typically about 1470 MPa. For a material and sheet thickness for the second member 3, which are not particularly specified here, a steel sheet having, for example, a thickness of 0.5 to 6.0 mm and a tensile strength of 390 MPa or more can be used.

The first member 2 illustrated in FIG. 1 can be used as a member constituting a joined structure 1 of an automotive bodyshell. Examples of the joined structure 1 include a floor cross member, a side sill, a front side member, and a floor tunnel brace. When the joined structure 1 is used as the floor cross member, the side sill, the front side member, the floor tunnel, or the like, it is preferable to use a high tensile strength steel sheet having a tensile strength of 590 MPa or more, and more preferably 780 MPa or more as the forming material.

The first member 2 has a substantially hat-shaped cross section that includes a top plate 4, ridges 4a, 4b continuing to the top plate 4, vertical walls 5a, 5b continuing to the ridges 4a, 4b, curved sections 6a, 6b continuing to the vertical walls 5a, 5b, and flanges 7a, 7b continuing to the curved sections 6a, 6b. The substantially hat-shaped cross section is one mode of a substantially gutter-shaped cross section. It is sufficient that the structural member (first member) 2 according to the present embodiment has the substantially gutter-shaped cross section including at least the top plate 4, the ridges 4a, 4b, and the vertical walls 5a, 5b, so that the curved sections 6a, 6b and the flanges 7a, 7b may be omitted. For example, a U-shaped cross section is included in the substantially gutter-shaped cross section.

In the perimeter of an axial end of the first member 2, outward continuous flanges 9a, 9b are formed in the region along the top plate 4, the ridges 4a, 4b, and the vertical walls 5a, 5b. The outward continuous flanges 9a, 9b are outward flanges without having notches, which are formed continuously in the region along the part of the top plate 4 that excludes the region along the groove 8, and in the region along the ridges 4a, 4b and the vertical walls 5a, 5b. The first member 2 is a member that has a ridge flange 50a or 50b at least in the region along each ridge 4a, 4b, which makes the first member 2 different from a known structural member that does not have the outward flange in the region along the ridges 4a, 4b in the axial end.

Thanks to the outward continuous flanges 9a, 9b of the first member 2, the ridges 4a, 4b, which receive the axial load, continues to contact surfaces with second member 3. Because of this, the load that the ridges 4a, 4b bear in the initial stage when an impact load is applied in the axial direction (for example, an amount of displacement stroke of 0 to 40 mm) becomes larger. Accordingly, the first member 2 is advantageous in load transfer capability.

It is sufficient that the width of the outward continuous flange 9a or 9b is at least 1 mm or more to allow for enhancing energy absorption efficiency by forming a groove 8, which will be described later. The width of the outward continuous flange 9a or 9b, however, is preferably 3 mm or more in view of allowing for a welding margin for laser welding, arc fillet welding, or the like, or preferably 10 mm or more in view of allowing for a welding margin for spot welding. The width of the outward continuous flange 9a or 9b is not necessarily constant along all the regions. In view of making press forming easier, for example, the width of the ridge flange 50a or 50b may be made smaller than that of the other part of the outward flange. The width of the outward continuous flange 9a or 9b is adjustable by modifying the shape of a blank into which the first member 2 is developed on a flat plane (a developed blank).

Incidentally, the term "outward flange" as used herein refers to a flange formed in the way that an end of a press formed product having a substantially gutter-shaped cross section is bent outwardly from the gutter. Further, the term "ridge flange" as used herein refers to a flange formed along the ridge region in an end of the press-formed product. Further, the term "outward continuous flange" refers to an outward flange continuously formed over the ridge and at least a part of each of a gutter bottom and the vertical wall.

Furthermore, the phrase "provide a notch in a flange" as used herein is meant to provide a notch formed in the whole width of a flange, which makes the flange discontinuous. The term "flange width" is used to have the same meaning as the height of a flange. Accordingly, when the flange width is made partially small but a part of the flange still remains, the notch is not meant to be provided in the flange.

Furthermore, the term "flange width" as used herein refers to the width of a raised flat portion of the flange that does not include the curved rising surface that connects the outward continuous flanges 9a, 9b to the top plate 4, the ridges 4a, 4b, and the vertical walls 5a, 5b.

As described above, the first member 2 according to the present embodiment has the outward continuous flanges 9a, 9b in the perimeter of the axial end thereof, or more particularly, in the region of the top plate 4 that excludes the region along the groove 8, and also in the region along the ridges 4a, 4b and the vertical walls 5a, 5b. It is sufficient, however, that the first member 2 has the ridge flange 50a or 50b at least in the region along each ridge 4a, 4b. In addition, the first member 2 may have an outward flange that has notches in the regions along the top plate 4 and the vertical walls 5*a*, 5*b* so that the notches make the outward flange discontinuous from the ridge flanges 50*a*, 50*b*.

Figure 2:
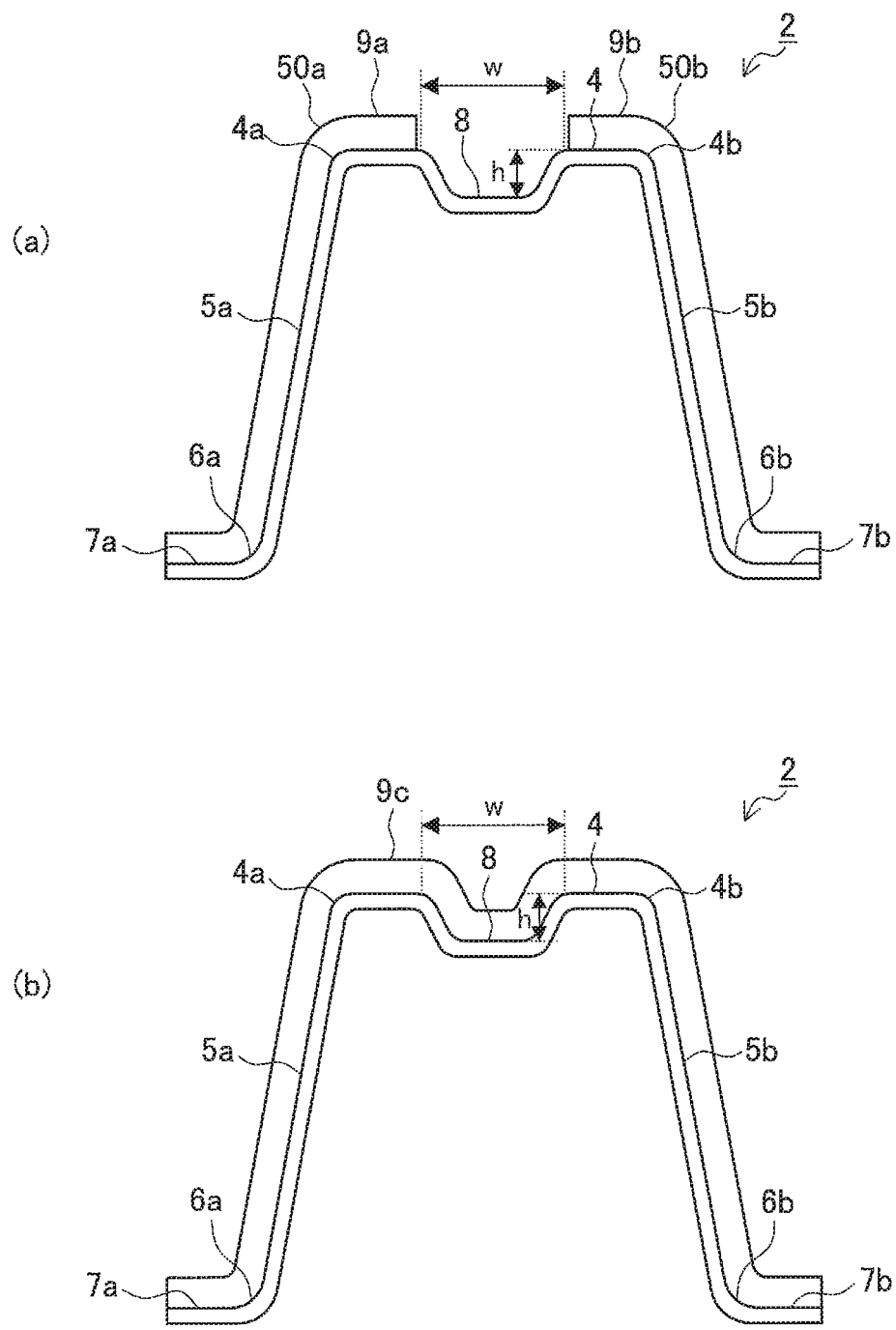
FIG. 2(a) is a view in the axial direction illustrating a structural member according to the present embodiment.
FIG. 2(b) is a view illustrating another structural example of a structural member.

Further, as illustrated in FIG. 2(*b*), the outward continuous flange 9*c* may be formed including the region along the groove 8 in the top plate 4. If the outward continuous flange 9*c* is also formed in the region along the groove 8, the axial load is transferred more easily to the ridges of the groove 8 so that such ridges will be also able to bear the load efficiently.

The top plate 4 of the first member 2 has the groove 8 disposed along the axial direction. The shape of the groove 8 can be, for example, a substantially trapezoidal shape or a V-letter shape. The first member 2 illustrated in FIG. 1 has the substantially-trapezoidal groove 8. The first member 2 having the groove 8 increases the number of load-bearing ridgelines so that the amount of impact energy absorption increases. Accordingly, this leads to, for example, weight reduction by reducing sheet thickness without sacrificing collision safety.

The upper width w of the groove 8 can be, for example, about 50 mm or less. In view of formability in press forming, however, the upper width w of the groove 8 is preferably 5 mm or more. In addition, the depth h of the groove 8 is set according to the width w of the groove 8 and also to the thickness t of the steel sheet according to the present embodiment. More specifically, the depth h of the groove 8 is set such that the depth h and the width w of the groove 8 and the thickness t of the steel sheet satisfy the following relation:

$$0.2 \times H_0 \leq h \leq 3.0 \times H_0 \quad (1)$$

$$H_0 = (0.037t - 0.25) \times w - 5.7t + 29.2 \quad (2)$$

The formula (2) above represents a groove depth $H_0$ when the amount of energy absorption per unit area (kJ/mm$^2$) in the cross section of the first member 2 becomes around the maximum value at a displacement stroke of 100 mm in the case that the first member 2 has the outward continuous flanges 9*a*, 9*b*. The cross section of the first member 2 as used above refers to the cross section in the end of the first member 2 that includes cross sections of the ends of the top plate 4, ridges 4*a*, 4*b*, and the vertical walls 5*a*, 5*b*, in which the cross sections are taken along the border with the curved rising surface that continues to the outward continuous flange 9*a* or 9*b*.

As indicated in the formula (1) above, if the groove depth h is within the range of 20 to 300% of $H_0$ that is the groove depth when the amount of energy absorption per unit area becomes around the maximum value, the energy absorption efficiency improves as compared to the structural member that has the outward flanges but does not have the ridge flanges 50*a*, 50*b*.

For example, when the sheet thickness t is 1.4 mm and the width w of the groove 8 is 10 mm, the groove depth $H_0$, in which the amount of energy absorption per unit area becomes around its maximum, is 20 mm. In this case, the depth h of the groove 8 is set from 4 mm to 60 mm. As another example, when the sheet thickness t is 1.4 mm and the width w of the groove 8 is 40 mm, the groove depth $H_0$, in which the amount of energy absorption per unit area becomes around its maximum, is 12 mm. In this case, the depth h of the groove 8 is set from 2.4 mm to 36 mm.

As still another example, when the sheet thickness t is 2.0 mm and the width w of the groove 8 is 10 mm, the groove depth $H_0$, in which the amount of energy absorption per unit area becomes around its maximum, is 17 mm. In this case, the depth h of the groove 8 is set from 3.4 mm to 51 mm. As still another example, when the sheet thickness t is 2.0 mm and the width w of the groove 8 is 40 mm, the groove depth $H_0$, in which the amount of energy absorption per unit area becomes around its maximum, is 10 mm. In this case, the depth h of the groove 8 is set from 2.0 mm to 30 mm.

The first member 2 having the above-described structure is joined to the second member 3 by welding via the outward continuous flanges 9*a*, 9*b* that include the ridge flanges 50*a*, 50*b*. Thereby, the amount of energy absorption increases in the initial stage of collision (at a displacement stroke of, for example, 40 mm or less) after receiving an impact load. In addition, the first member 2 has the groove 8 in the top plate 4 and the outward continuous flanges 9*a*, 9*b* that include the ridge flanges 50*a*, 50*b* in the axial end. Thereby, the buckling behavior of the first member 2 becomes stable in the middle and later stage of collision (at a displacement stroke of, for example, more than 40 mm) so that the amount of energy absorption is increased.

Moreover, even if an impact load applies to the first member 2 slantwise relative to the axial direction, for example, the buckling behavior of the first member 2 during collision is still stable, and thus robustness against the load input is improved for the first member 2 according to the present embodiment. Consequently, the structural member (first member) 2 according to the present embodiment has excellent load transfer capability.

It should be noted that the above-described first member 2 has an open cross section but the structural member according to the present embodiment is not limited to this mode. For example, the structural member may be shaped to have a closed cross section in which another member is joined via flanges 7*a*, 7*b*. Moreover, the first member 2, which has one groove 8 in the top plate 4, may have a plurality of grooves.

<2. Example of Method for Manufacturing Structural Member for Automotive Body>

An example of the method for manufacturing the structural member (first member) 2 for an automotive body according to the present embodiment will now be described. The structural member 2 according to the present embodiment is manufactured by press forming a high-tensile steel sheet having, for example, a sheet thickness within the range of 0.5 mm to 6.0 mm and a tensile strength of 390 MPa or more, and thus forming defects such as wrinkling and cracking generally tend to occur.

For example, when attempting to form the outward continuous flanges 9*a*, 9*b* having a certain degree of flange width along the whole perimeter of the axial end of the structural member 2, forming defects such as cracking of stretched flange in the edge of each ridge flange 50*a*, 50*b* and wrinkling near the base of each ridge flange 50*a*, 50*b* tend to occur during press forming. In general, as the material strength becomes higher, cracking in the edge and wrinkling near the base of each ridge flange 50*a*, 50*b* are more likely to occur.

Accordingly, when using a high-tensile steel sheet as the forming material, it is difficult for press forming methods known in the art to manufacture the structural member having the outward continuous flanges including ridge flanges because of constraints in press forming. Consequently, a notch has hitherto had to be provided in the region along the ridge in the outward flange to compensate such difficulty in press forming. Providing the notch is a cause to lower performance in terms of load transfer capability, flexural rigidity, and torsional rigidity.

In contrast, the structural member 2 according to the present embodiment can be manufactured by a manufacturing method as described below even though it has the outward continuous flanges 9a, 9b that include the ridge flanges 50a, 50b. An example of the press-forming apparatus that can be used for manufacturing the structural member 2 according to the present embodiment will be described hereafter, and then a manufacturing method will be explained more specifically.

(2-1. Press-Forming Apparatus)

Figure 3:
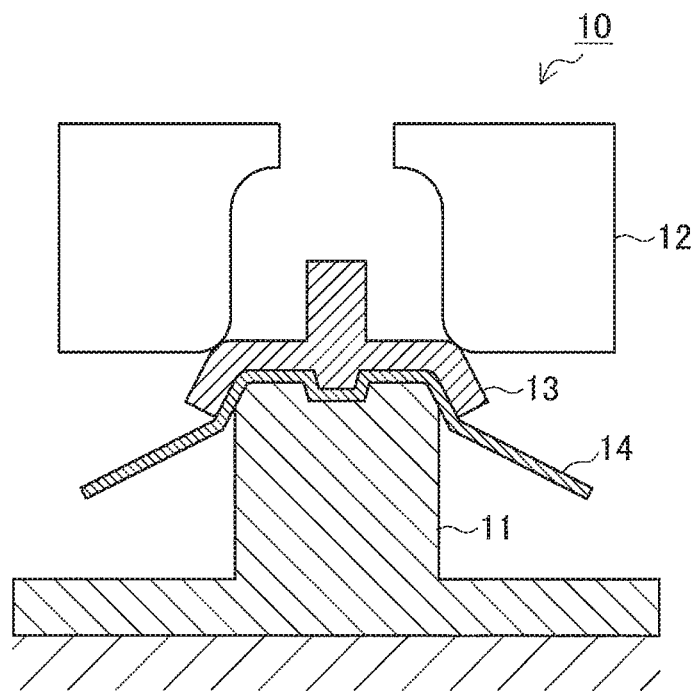
FIG. 3 is a cross sectional view illustrating a press-forming apparatus for manufacturing a structural member.
Figure 4:
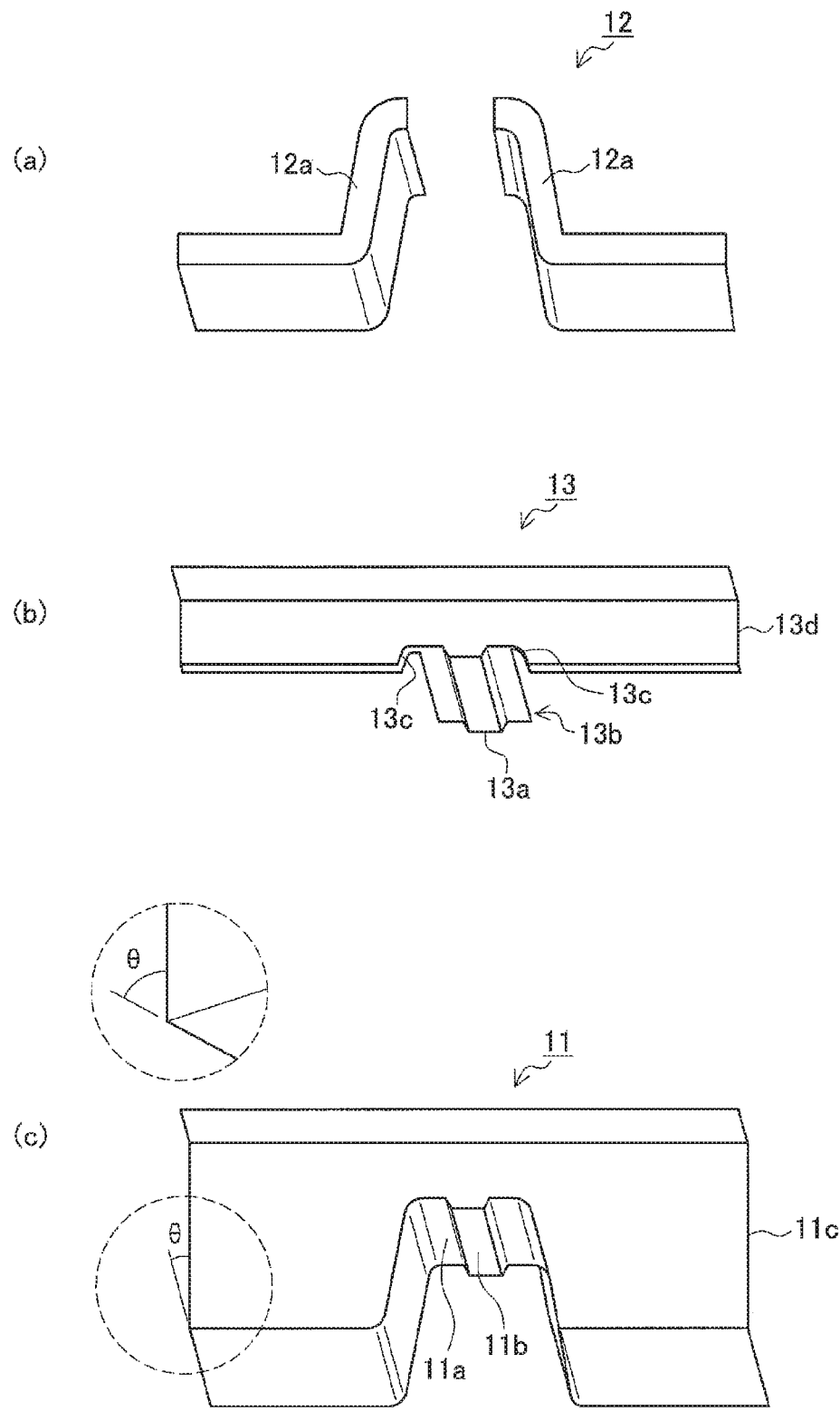
FIG. 4(a) is a perspective view illustrating a die.
FIG. 4(b) is a perspective view illustrating a ridge pad.
FIG. 4(c) is a perspective view illustrating a punch.

FIG. 3 and FIG. 4 are schematic views illustrating a press-forming apparatus 10 to be used for manufacturing the structural member 2. FIG. 3 is a cross sectional view illustrating a part of the press forming apparatus 10, which corresponds to an end of the structural member 2. FIG. 4(a) is a perspective view illustrating a die 12, and FIG. 4(b) is a perspective view illustrating a pad 13. FIG. 4(c) is also a perspective view illustrating a punch 11. FIGS. 4(a) to 4(c) are respective perspective views illustrating the die 12, the pad 13, and the punch 11, as viewed slantwise from upper left, and the parts to form the outward continuous flanges 9a, 9b are shown on the deep side of the paper surface.

The press-forming apparatus 10 includes the punch 11 and the die 12, and the pad 13 that presses the forming material 14 against the punch 11 and restrains the forming material 14. The punch 11 has a groove-forming part 11b that is formed in an upper surface 11a of the punch 11 and extends in the longitudinal direction, and has a side wall 11c formed in the longitudinal end. The rising angle θ of the side wall 11c is, for example, 50° to 90°.

The shape of the groove-forming part 11b corresponds to the shape of the groove 8 to be formed in the structural member 2. For example, the groove-forming part 11b has a cross section of a trapezoidal shape or a V-letter shape (FIG. 3 (b) illustrates the trapezoidal shape). The width in the direction perpendicular to the axial direction in the top opening of the groove-forming part 11b is approximately 50 mm or less. The depth of the groove-forming part 11b is designed to correspond to the shape of the groove 8 of the structural member 2, which is determined by satisfying the above-described formulas (1) and (2).

The pad 13 has a top plate pressing part 13b including a bump part 13a, a ridge-pressing part 13c, and a side wall 13d. The bump part 13a faces the groove-forming part 11b that is formed in the punch 11 and extends in the longitudinal direction. The top plate pressing part 13b having the bump part 13a presses, and restrains, a portion to be formed into the top plate 4 in the forming material 14 against the upper surface 11a of the punch 11. The top plate 4 having the groove 8 is formed by the pad 13 that presses the forming material 14 against the upper surface 11a of the punch 11.

The ridge-pressing part 13c presses against the punch 11, and restrains, the ends of portions to be formed into ridges 4a, 4b in the vicinity of portions to be formed into outward continuous flanges 9a, 9b in the forming material 14. The pad 13 is hereinafter referred to as the ridge pad.

More specifically, the ridge pad 13 restrains the portion to be formed into the top plate 4 and also the end of the portion to be formed into each ridge 4a, 4b in the vicinity of the portion to be formed into each outward continuous flange 9a, 9b in the forming material 14. It is sufficient, however, that the ridge pad 13 restrains at least the end of the portion to be formed into each ridge 4a, 4b. The other parts of the portions to be formed into ridges 4a, 4b, the portion to be formed into the top plate 4, and the portions to be formed into vertical walls 5a, 5b may leave unrestrained.

Figure 5:
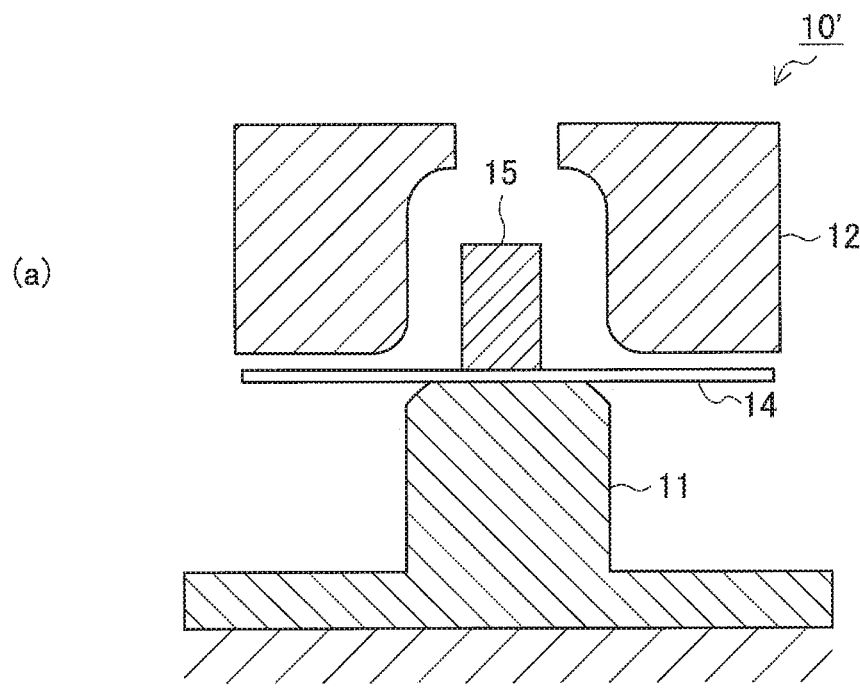
FIG. 5(a) is a cross sectional view illustrating a press-forming apparatus including a pad known in the art.
FIG. 5(b) is a schematic view illustrating a state in which a forming material is restrained by a pad known in the art.
Figure 5:
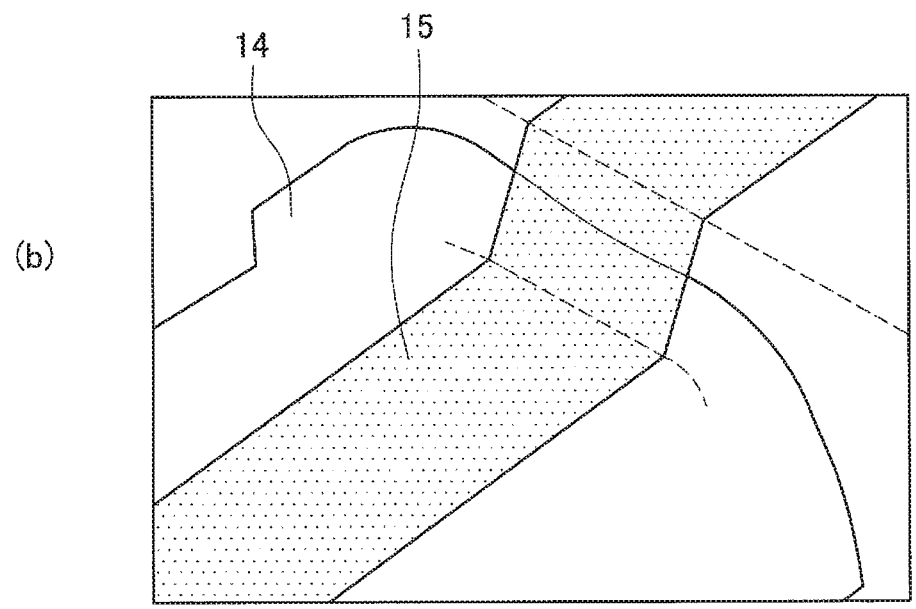

FIG. 5 is a schematic view illustrating the shape of a pad 15 known in the art. FIG. 5(a) is a cross sectional view illustrating a press-forming apparatus 10' having the pad 15 known in the art, and FIG. 5(b) is a perspective view illustrating a state in which the forming material 14 is pressed by the known pad 15. FIG. 5(a) is a cross sectional view illustrating the same portion of the press-forming apparatus 10 as illustrated in FIG. 3. As illustrated, the known pad 15 restrains the portion to be formed into the top plate 4 in the forming material 14 but does not restrain the portion to be formed into each ridge 4a, 4b.

The press-forming apparatus 10 presses the end of the portion to be formed into each ridge 4a, 4b using the ridge pad 13, and project outward approximately only the steel sheet material nearby. Thereby, the ridges 4a, 4b in the vicinity of the outward continuous flanges 9a, 9b are formed. Accordingly, this reduces the movement of the material in the region that the ridge pad 13 contacts, and thus reduces the generation of cracking of stretched flange in the end of the edge of each ridge flange 50a, 50b and wrinkling near the base of each ridge flange 50a, 50b.

The ridge pad 13 is aimed at reducing the movement of the surrounding material by projecting outward the material in the end of the portion to be formed into each ridge 4a, 4b to form the end of each ridge 4a, 4b. Accordingly, the extent of the portion to be formed into each ridge 4a, 4b that is restrained by the ridge pad 13 in the vicinity of the portion to be formed into each outward continuous flange 9a, 9b is preferably at least ⅓ or more of the perimeter length of the cross section of the portion to be formed into each ridge 4a, 4b starting from the border between each ridge 4a, 4b and the top plate 4.

In addition, the extent in the axial direction in the portion to be formed into each ridge 4a, 4b that is restrained by the ridge pad 13 in the vicinity of the portion to be formed into each outward continuous flange 9a, 9b can be, for example, 5 mm to 100 mm along the axial direction from the base of the outward continuous flanges 9a, 9b. If this restrained extent is less than 5 mm, there arises a concern that it may become difficult to prevent distortion or scratches that may occur during press forming. In addition, the portion to be formed into each ridge 4a, 4b may be restrained over the whole length in the axial direction. However, if the above-described restrained extent exceeds 100 mm, the load that the ridge pad 13 requires to press the forming material 14 may increase.

The die 12, which has a rising surface 12a formed in the longitudinal end, is disposed facing the punch 11. The die 12, which does not have a pressing surface corresponding to the portion to be formed into the top plate 4 in the structural member 2, is disposed such that it does not overlap the pad 13 in the pressing direction. The die 12 bends the forming material 14 along the portion to be formed into each ridge 4a, 4b while the portion to be formed into the top plate 4 and the end of the portion to be formed into each ridge 4a, 4b in the forming material 14 are restrained by the ridge pad 13.

Incidentally, the bending of the forming material 14 by the die 12 may be bending forming in which the die 12 presses and bends the forming material 14, or may be deep drawing in which a blank holder (not shown) and the die 12 clamp and bend the forming material 14.

(2-2. Manufacturing Method)

Figure 6:
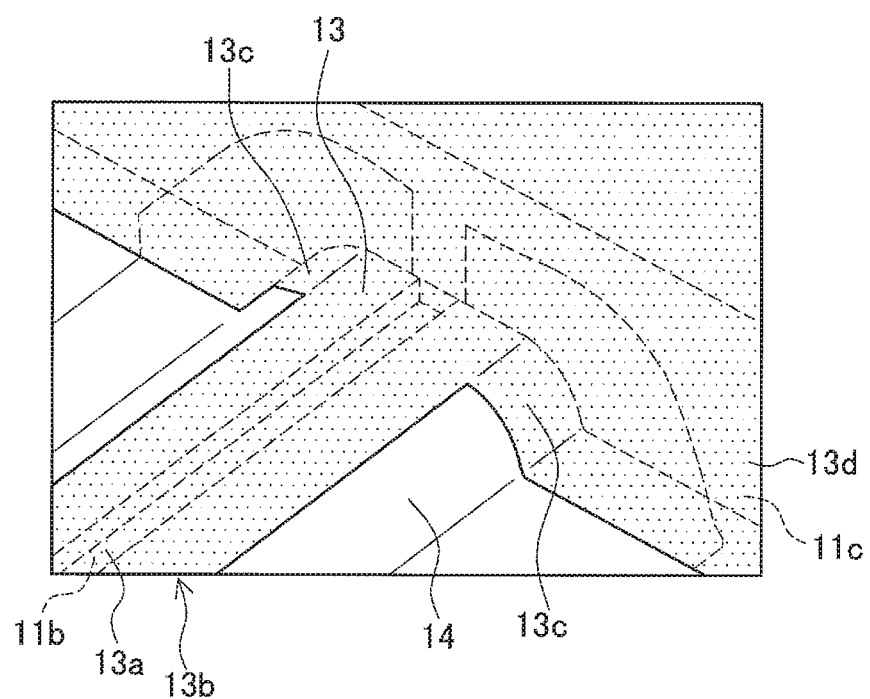
FIG. 6 is a schematic view illustrating a state in which a forming material is restrained by a ridge pad.

Now, a method for manufacturing the structural member 2 using the press-forming apparatus 10 will be described with reference to FIG. 6 together with FIG. 3 and FIG. 4. FIG. 6 is a perspective view illustrating a state in which the forming material 14 is restrained by the ridge pad 13.

The forming material 14, which is a developed blank having a shape into which the structural member 2 to be formed is developed on a flat plane, is first placed on the punch 11 in the press-forming apparatus 10. Subsequently, the ridge pad 13 thrusts and presses the forming material 14 against the punch 11, as illustrated in FIG. 3 and FIG. 6. At this time, a part of the portion to be formed into each outward continuous flange 9a, 9b in the forming material 14 is bent opposite to the pressing direction by the side wall 11c of the punch 11 and the side wall 13d of the ridge pad 13.

The end of the portion to be formed into each ridge 4a, 4b in the vicinity of the portion to be formed into each outward continuous flange 9a, 9b in the forming material 14 is bent in the pressing direction by the ridge-pressing part 13c of the ridge pad 13, and then restrained by the ridge-pressing part 13c and the punch 11. The top plate pressing part 13b of the ridge pad 13 subsequently presses the portion to be formed into the top plate 4 in the forming material 14 to cause the bump part 13a to push a part of the forming material 14 into the groove-forming part 11b of the punch 11, and then to cause the top plate pressing part 13b and the punch 11 to restrain the forming material 14.

While the forming material 14 is restrained by the ridge pad 13 and the punch 11 as described above, the die 12 and the punch 11 carry out first press forming. In the first press forming, a decrease or an increase in sheet thickness is reduced, which otherwise causes cracking in the edge of the ridge flange 50a or 50b or wrinkling near the base of the ridge flange 50a or 50b. The first press forming provides an intermediate product having the substantially gutter-shaped cross section and having the ridges 4a, 4b, the vertical walls 5a, 5b, and the top plate 4 including the groove 8 that extends in the longitudinal direction. The intermediate product has the outward continuous flanges 9a, 9b formed in the regions along the ridges 4a, 4b, a part of the top plate 4, and the vertical walls 5a, 5b, in the longitudinal end of the intermediate product.

Incidentally, FIG. 6 illustrates a state in which the outward continuous flanges 9a, 9b is formed in the regions along the ridges 4a, 4b, a part of the top plate 4 excluding the region along the groove 8, and the vertical walls 5a, 5b. It is sufficient, however, that the outward flange is formed at least in the region along the ridges 4a, 4b. In addition, the outward flange may be an outward continuous flange 9c that includes the region along the groove 8 (see FIG. 2(b)). The shape and width of the outward flange can be adjusted by modifying the shape of the developed blank to be formed into the forming material 14.

In addition, press forming of the intermediate product is described in the above example in which the end of the portion to be formed into each ridge 4a, 4b and the end of the portion to be formed into the top plate 4, in the forming material 14, are restrained by the ridge pad 13. However, the method for manufacturing the structural member 2 is not limited to this example. The extent restrained by the ridge-pressing part 13c of the ridge pad 13 may be a region of at least ⅓ or more of the perimeter length of the cross section of each ridge 4a, 4b starting from the border between each ridge 4a, 4b and the top plate 4, in the portion to be formed into each ridge 4a, 4b. If the extent of the forming material 14 restrained by the ridge pad 13 is smaller than the above-described extent, the ridge pad 13 may not achieve the effect to reduce the generation of cracking and wrinkling sufficiently.

After the first press forming is carried out as described above, the intermediate product is then subjected to second press forming to form the parts that are left unformed in the first press forming. The second press forming presses the portion that has not been formed by the ridge pad 13 and the die 12 and forms the structural member 2 having the final shape. More specifically, a part of the portion in each vertical wall 5a, 5b, which is located underneath the ridge pad 13 in the pressing direction, is not completely press formed by the ridge pad 13 in the first press forming. Accordingly, the part of the portion is press formed in the second press forming by employing a different press-forming apparatus.

Incidentally, the outward continuous flanges 9a, 9b may not be raised to the angle in the final product in the first press forming due to the shape of the outward continuous flanges 9a, 9b or the rising angle of flange. In this case, the outward continuous flanges 9a, 9b may be raised approximately to a predetermined angle, for example, to 60°, in the first press forming, and then further raised to the angle of the final product in the second press forming or subsequent press forming.

The press-forming apparatus to be used in the second press forming may be an apparatus that can form what is not formed in the first press forming. This press-forming apparatus can be constituted by using a known press-forming apparatus having a die and punch. If the second press forming does not complete forming into the final shape of the structural member 2, another forming process may be further carried out.

Incidentally, although an example in which the groove 8 in the top plate 4 is formed by the ridge pad 13 in the first press forming has been described as the present embodiment, the groove 8 may be formed by die 12. In addition, although an example in which the groove 8 is formed in the top plate 4 in the first press forming has been described as the present embodiment, the groove 8 may be formed in the second press forming.

As described above, the structural member 2 is formed, with reduced cracking in the edge and reduced wrinkling near the base of each ridge flange 50a, 50b, by carrying out press forming using the ridge pad 13 including the ridge-pressing part 13c and the top plate pressing part 13b that has the bump part 13a. The structural member (first member) 2 is joined to the second member 3 via the outward continuous flanges 9a, 9b formed in the longitudinal end to provide the joined structure 1 including the first member 2 and the second member 3.

It should be noted that the structural member having the outward flange formed also in the region along the groove 8 in the longitudinal end, as illustrated in FIG. 2(b), can be manufactured, for example, in a sequence described below. That is to say, a pad that has the ridge-pressing part 13c but does not have the bump part 13a forms an intermediate product having the outward continuous flange including the outward flange formed also in the whole perimeter region along the top plate, in the first stage. Subsequently, the intermediate product is pressed to form the groove 8 in the top plate 4 by using a pad or a punch having the bump part 13a for forming the groove 8 in the second stage. Thereby, the structural member, which has the outward flange in the region of the groove 8, can be obtained.

In particular, thanks to the outward continuous flanges 9a, 9b that are also formed in the regions of the ridges 4a, 4b, the structural member according to the present embodiment improves energy absorption efficiency even though the depth of the groove 8 is relatively small. Consequently, a desired outward flange can be provided also in the region along the groove 8 for the structural member by the above-described press forming in the second stage.

As described in the foregoing, the structural member 2 according to the present embodiment is made to increase the amount of energy absorption in the initial stage of collision, thanks to having the outward continuous flanges 9a, 9b, which include the ridge flanges 50a, 50b, in the longitudinal end of the structural member 2. Moreover, the structural member 2 according to the present embodiment has the outward continuous flanges 9a, 9b as well as the groove 8 in the top plate 4 that is configured in a predetermined range so that the energy absorption efficiency in the middle and later stage of collision is increased. Consequently, the structural member 2 according to the present embodiment is excellent in load transfer capability, flexural rigidity, and torsional rigidity, which makes the structural member suitable for structural members for an automotive body.

Moreover, the structural member 2 according to the present embodiment has the outward continuous flanges 9a, 9b that include the ridge flanges 50a, 50b, which allows a groove 8 having an effective depth h determined according to the width w of the groove 8 and the sheet thickness t to be provided in the structural member 2. Consequently, it becomes easier to form the groove 8 having a desired depth that can improve the energy absorption efficiency, even in press forming a high-tensile steel sheet that is relatively difficult to form, so that the structural member having excellent load transfer capability and rigidity can be obtained with a high production yield.

A preferable embodiment has been described so far with reference to the accompanied drawings. The present invention, however, is not limited to the above-described example. It will be evident that those skilled in the art to which the present invention pertains may conceive various alternatives and modifications while remaining within the scope of the technical idea as described in the claims. It should be understood that such alternatives and modifications apparently fall within the technical scope of the present invention.

EXAMPLE(S)

Examples of the present invention will now be described.
(Analysis 1)

Figure 7:
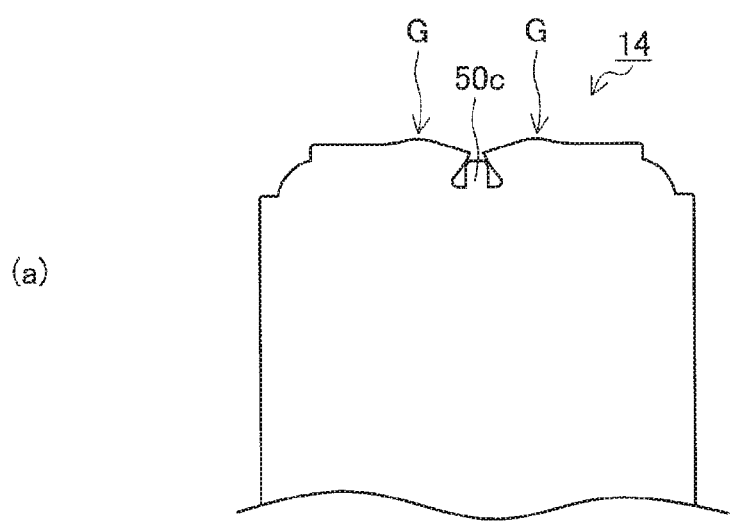
FIG. 7(a) is an overall plan view illustrating a shape of a developed blank used in Analysis 1.
FIG. 7(b) is an enlarged plan view illustrating a longitudinal end of a developed blank.
Figure 7:
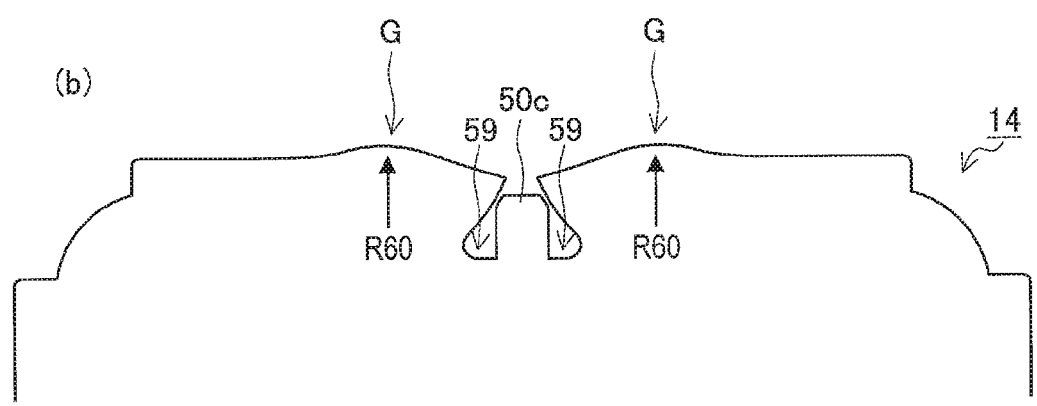

In Analysis 1, decrease rates of sheet thickness (or increase rates of sheet thickness) in the edge and the base of ridge flanges 50a, 50b in a structural member 2 according to Example was first evaluated. FIG. 7 is a plan view illustrating a shape of a developed blank as a forming material 14 for a structural member 2 used in Analysis 1. FIG. 7(*a*) is an overall plan view illustrating the shape of the forming material 14 including an end in the longitudinal direction, and FIG. 7(*b*) is an enlarged plan view illustrating the longitudinal end.

The forming material 14 is made of a dual-phase (DP) steel sheet having a sheet thickness of 1.4 mm and a tensile strength of 980 MPa class measured by tensile testing in accordance with JIS Z 2241. In the forming material 14, a portion G to be formed into each ridge flange 50a, 50b has such a shape as to intend the dispersion of deformation (a curvature radius of 60 mm). In addition, a notch 59 is provided in the end of each ridgeline within a region along a groove 8, while an outward flange 50c is also formed in a region along the portion to be formed into the groove 8 in the end.

Figure 8:
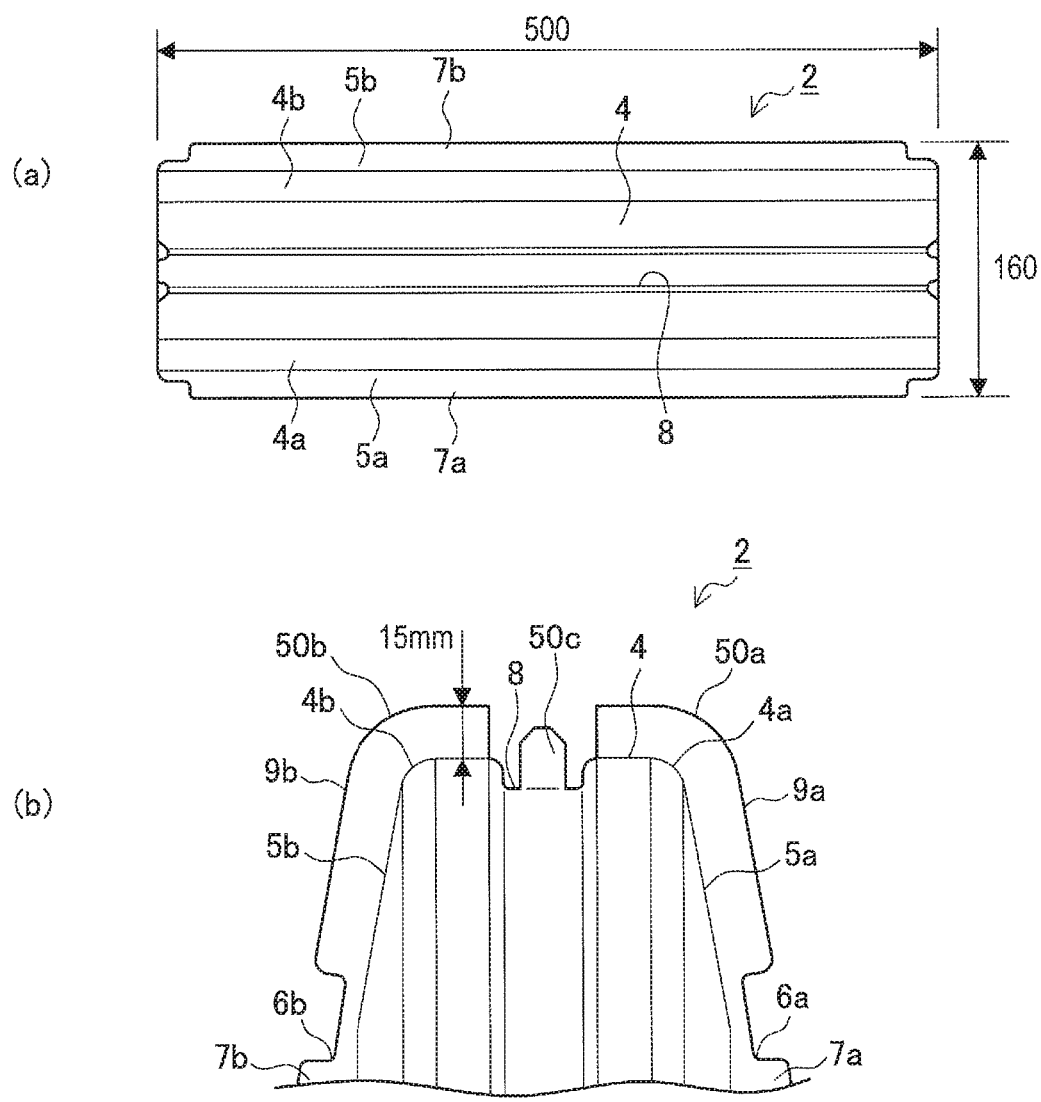

FIG. 8 and FIG. 9 illustrate a structural member (first member) 2 to be formed from the forming material 14 that is illustrated in FIG. 7. FIG. 8(*a*) is a top plan view illustrating the structural member 2 as viewed from the top plate 4 side, and FIG. 8(*b*) a diagrammatic view of the structural member 2 as viewed slantwise from above in the longitudinal direction. In addition, FIG. 9 is a cross sectional view of the structural member 2. The height of the structural member 2 is 100 mm. The curvature radius of the cross section of a ridge 4a or 4b is 12 mm and the depth of the groove 8 is 7.5 mm. Other dimensions are as shown in FIG. 8(*b*) and FIG. 9.

FIG. 10 and FIG. 11 are schematic views illustrating a press-forming apparatus 10 used in the first press forming in manufacturing the structural member 2 of Example. FIG. 10 is a perspective view of the press-forming apparatus 10, and FIGS. 11(*a*) to 11(*c*) are schematic views illustrating Cross Section 1, Cross Section 2, and Longitudinal Section in FIG. 10, respectively. In addition, FIG. 12 and FIG. 13 are schematic views illustrating a press-forming apparatus 20 used in the second press forming in manufacturing the structural member 2 of Example. FIG. 12 is a perspective view of the press-forming apparatus 20, and FIG. 13(*a*) and FIG. 13(*b*) are schematic views illustrating Cross Section and Longitudinal Section in FIG. 12, respectively. Each of FIG. 10 and FIG. 12 illustrates only a part for forming one end of the structural member 2.

When the structural member 2 was press formed from the forming material 14 by using the first and second press-forming apparatuses 10, 20, the deformation behavior of the forming material 14 was analyzed by the finite element method. In the first press forming, a ridge pad 13 according to Example was used to form an intermediate product with the intention to reduce cracking in the edge and wrinkling near the base of ridge flanges 50a or 50b to be formed in the region along ridges 4a, 4b in the longitudinal end. In the first press forming, a descending die 12 and a punch 11 carried out press forming after the forming material 14 was pressed by the ridge pad 13.

The first press forming does not form the shape of a portion located, in the pressing direction, under the region in each ridge 4a, 4b that is pressed by the ridge pad 13, as illustrated in FIG. 11(*a*). Accordingly, the portion that was not formed in the first press forming was formed by the second press forming. In the second press forming, re-striking was carried out using bending forming, while forming what was not formed in the first press forming. In the second press forming, a top portion 41 of an intermediate product 40 was first restrained by a pad 23 that had a bump part 23a corresponding to the groove 8 in shape. Subsequently, bending forming was carried out by lowering a die 22 toward a punch 21 to form the structural member 2.

Figure 14:
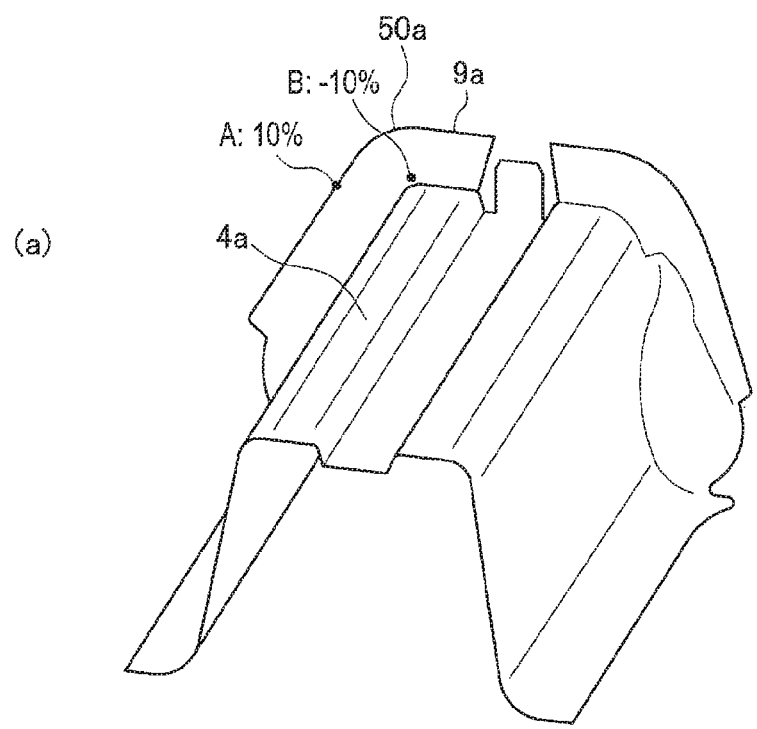
Figure 14:
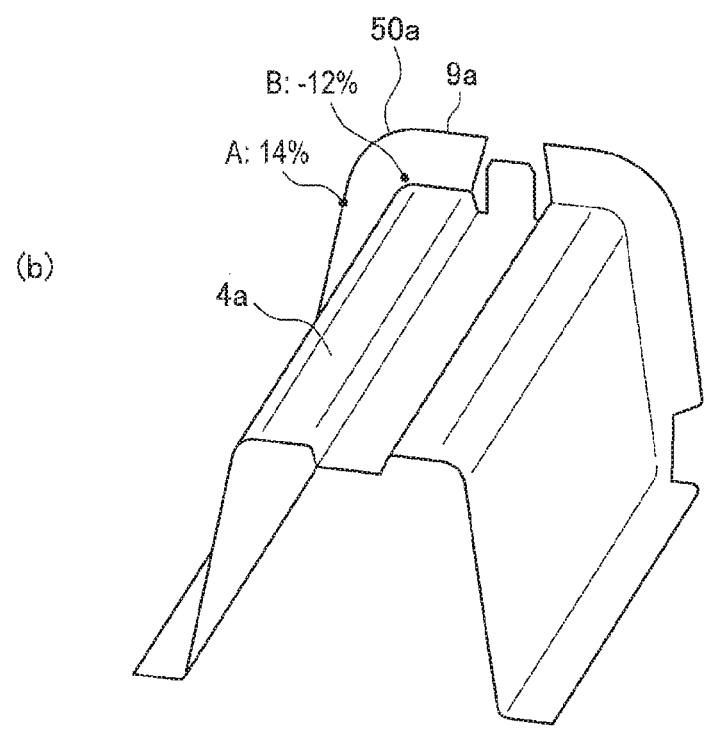

FIGS. 14(*a*) and 14(*b*) respectively illustrate the obtained intermediate product 40 and structural member 2 in which the analytical results on decrease rates of sheet thickness in the edge and near the base of each ridge flange 50a, 50b are shown. FIG. 14 shows a maximum decrease rate of sheet thickness in the vicinity of a region A, which is vulnerable to cracking in the edge of the ridge flange 50a or 50b, and a minimum decrease rate of sheet thickness in the vicinity of a region B, which is vulnerable to wrinkling near the base of the ridge flange 50a or 50b. A negative value in decrease rate of sheet thickness means increase rate of sheet thickness.

As the press forming proceeds from the first press forming to the second, the decrease rate of sheet thickness becomes larger in the region vulnerable to cracking, in other words, in the vicinity of the edge of each ridge flange 50a, 50b (region A), as shown in FIG. 14. It should be noted that, in the obtained structural member 2, the decrease rate of sheet thickness, in the region vulnerable to cracking, in other words, in the vicinity of the edge of each ridge flange 50a, 50b (region A), was about 14%, with which cracking is avoidable.

As the press forming proceeds from the first press forming to the second, the increase rate of sheet thickness becomes larger in the region vulnerable to wrinkling, in other words, in the vicinity of the base of each ridge flange 50a, 50b (region B), as shown in FIG. 14. It should be noted that, in the obtained structural member 2, the increase rate of sheet thickness, in the region vulnerable to wrinkling or near the base of each ridge flange 50a, 50b (region B), was about 12%, with which wrinkling is reduced.

(Analysis 2)

Subsequently, energy absorption efficiency for the structural member 2 according to Example, which had both the outward continuous flanges 9a, 9b including the ridge flanges and the groove 8 in the top plate 4, was evaluated in Analysis 2. In Analysis 2, the joined structure 1 in which the structural member (first member) 2 was joined to a second member 3 by spot welding was assumed (see FIG. 1), and the axial load and the amount of energy absorption were evaluated when the structural member 2 was pressed along the axial direction from the side where the second member 3 was joined. In Analysis 2, the displacement stroke was set up to 40 mm, which corresponded to the initial stage of collision, with the intention to evaluate collision-safety capability from a deformation prevention point of view.

Figure 15:
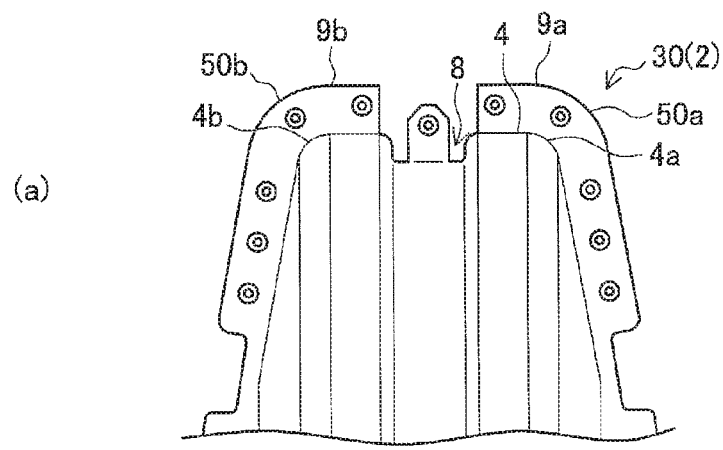
Figure 15:
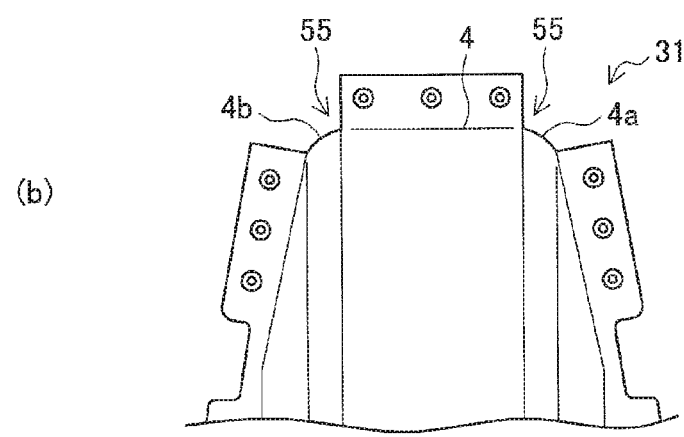
Figure 15:
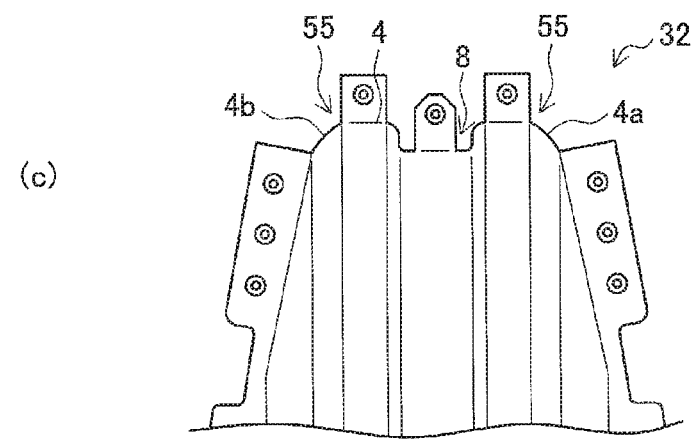

FIG. 15 is schematic views illustrating analytical models used in Analysis 2. FIG. 15(a) illustrates an analytical model 30 of the structural member 2 according to Example, and FIG. 15(b) illustrates an analytical model 31 of Comparative Example 1, which does not have either the ridge flanges or the groove. FIG. 15(c) illustrates an analytical model 32 of Comparative Example 2, which has the groove 8 but does not have the ridge flanges. FIGS. 15(a) to 15(c) are diagrammatic views of each analytical model 30, 31, 32 as viewed slantwise from above in the longitudinal direction. In addition, FIG. 16 is an overall view of the analytical models 30, 31, 32 as viewed from the lateral direction relative to the longitudinal direction.

The analytical model 31 of Comparative Example 1 has the same shape as the analytical model 30 of the structural member 2 according to Example, except that a groove is not provided in the top plate 4 of the first member 2, and a notch 55 is provided in the outward flange in the longitudinal end of each ridge 4a, 4b in the analytical model 31. In addition, the analytical model 32 of Comparative Example 2 has the same shape as the analytical model 30 of the structural member 2 according to Example, except that a notch 55 is provided in the outward flange in the longitudinal end of each ridge 4a, 4b in the analytical model 32.

In Analysis 2, each analytical model 30, 31, 32 was spot welded, via flanges 7a, 7b, to a closing plate 45 made of a 0.6 mm thick steel sheet having a tensile strength of 270 MPa class. Each analytical model 30, 31, 32 had the same shape as the above described structural member 2 illustrated in FIG. 8 and FIG. 9, except for the presence of the closing plate 45 joined thereto and the presence or non-presence of the groove or the ridge flange. Each analytical model 30, 31, 32 used the same forming material 14 as in Analysis 1, which was a 1.4 mm thick steel sheet having a tensile strength of 980 MPa class. This analysis assumed the second member 3 as a rigid-body wall with the intention to study the influence of the shape of the joint portion and the influence of the structure of the structural member 2 on collision-safety capability.

FIG. 17 is a graph showing the analytical results on axial load vs. stroke characteristics, and FIG. 18 is a graph showing the analytical results on amount of energy absorption vs. stroke characteristics. As shown in FIG. 17, the analytical model 30 of the structural member 2 according to Example exhibits a higher peak value in the axial load (kN) as compared to the analytical model 31 of Comparative Example 1. In addition, in the analytical model 30 of the structural member 2 according to Example, a peak value in the axial load (kN) in the initial stage of collision has appeared on the smaller-stroke side of the graph, in other words, in an earlier timing, as compared to the analytical model 31, 32 of Comparative Examples 1, 2.

Moreover, in association with the peak difference in the axial load, the amount of energy absorption (kJ) is also higher for the analytical model 30 of the structural member 2 according to Example than that for the analytical model 31 of Comparative Example 1. The structural member 2 according to Example also exhibits a higher amount of energy absorption (kJ) than that of the analytical model 32 of Comparative Example 2 that has the groove 8 and the notches formed in the outward flange.

These results are likely due to the fact that the analytical model 30 of the structural member 2 according to Example has more ridges that serve to transfer the load than those of the analytical model 31 of Comparative Example 1. It is also likely that, in the analytical model 30 of the structural member 2 according to Example, the outward continuous flanges 9a, 9b that include the ridge flanges 50a, 50b cause the ridges to produce a high axial stress from the initial stage of collision and to be able to make the axial load confined and transferable with a high efficiency. The above-described results from Analysis 2 show that the structural member 2 according to Example has an excellent ability as a deformation prevention member as compared to Comparative Examples 1, 2.

(Analysis 3)

In Analysis 3, the energy absorption efficiency of the structural member 2 according to Example was evaluated in the middle and later stage of collision. In Analysis 3, the analytical model 30 of the structural member 2 according to Example illustrated in FIG. 15(a) and the analytical model 32 according to Comparative Example 2 illustrated in FIG. 15(c) were used among the analytical models used in Analysis 2. In particular, the only difference between the shapes of two analytical models 30, 32 is whether or not the notches 55 are provided in the outward flange. The basic features of the shape and structure of the analytical models 30 and 32, including having the closing plate 45 joined, are the same as in Analysis 2.

In Analysis 3, however, each type of the analytical models 30, 32 was formed using two different types of steel sheets, in other words, a 1.4 mm thick steel sheet of 340 MPa class in tensile strength and a 1.4 mm thick steel sheet of 980 MPa class in tensile strength. Further in Analysis 3, four different type of depths of the groove 8, such as depths of 7.5 mm, 15 mm, 30 mm, and 40 mm, were provided and then analyzed per each type of the steel sheet per each analytical model 30, 32. The displacement stroke for Analysis 3 was set up to 100 mm to cover the middle and later stage of collision.

Figure 19:
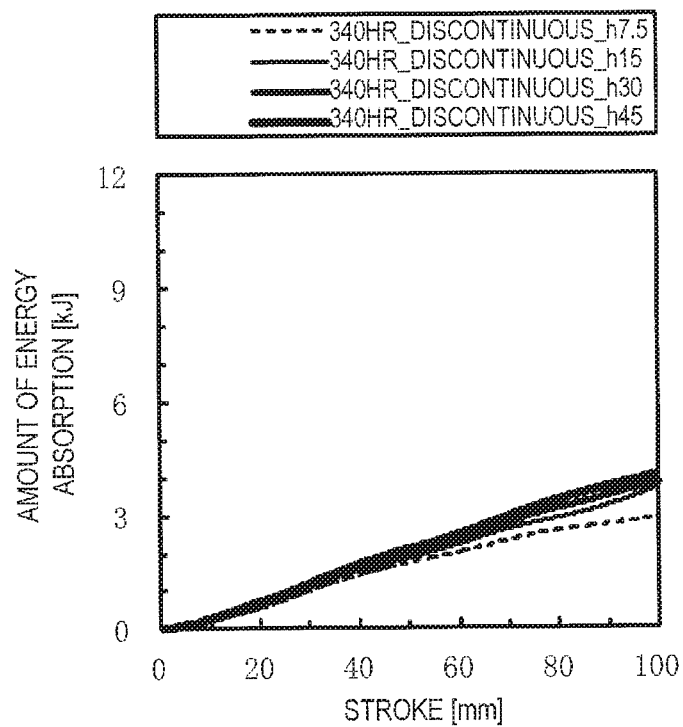
Figure 19:
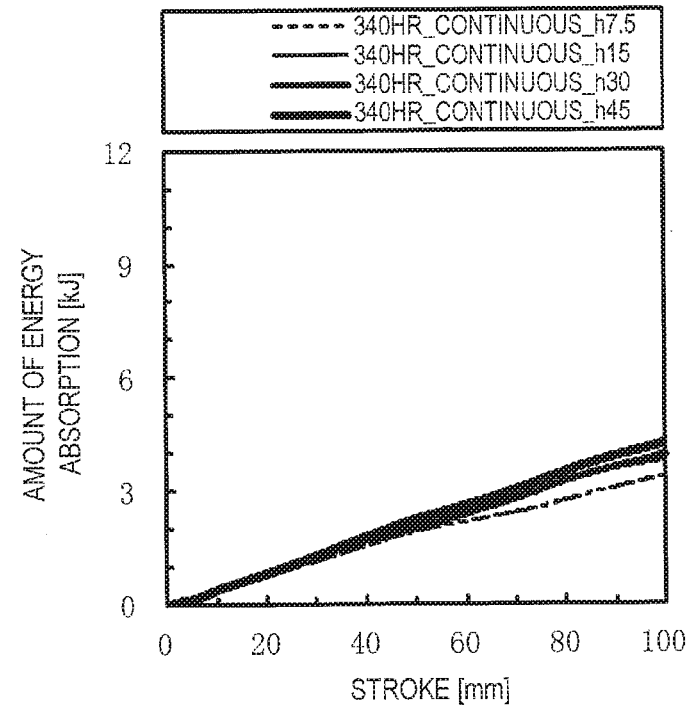

FIG. 19 and FIG. 20 show the analytical results for the analytical models 30, 32 in which the 1.4 mm thick steel sheet of 340 MPa class in tensile strength was used. FIG. 19(a) is a graph showing the analytical results on amount of energy absorption vs. stroke characteristics for the analytical model 32 according to Comparative Example 2, and FIG. 19(b) is a graph showing the analytical results on amount of energy absorption vs. stroke characteristics for the analytical model 30 of the structural member 2 according to Example. In addition, FIG. 20 is a graph showing the analytical results on amount of energy absorption vs. groove depth characteristics at a displacement stroke of 100 mm for each of the analytical model 30 of the structural member 2 according to Example and the analytical model 32 of Comparative Example 2.

As shown in FIG. 19, when the 1.4 mm thick steel sheet of 340 MPa class in tensile strength is used, the analytical model 30 of the structural member 2 according to Example exhibits higher amounts of energy absorption (kJ) than those of the analytical model 32 of Comparative Example 2 over the period until the displacement stroke reaches 100 mm. However, an increase effect on the amount of energy absorption is limited. In addition, as shown in FIG. 20, the analytical model 30 of the structural member 2 according to Example exhibits a higher amount of energy absorption for every groove depth h at a displacement stroke of 100 mm (kJ) than that of the analytical model 32 of Comparative Example 2.

Figure 21:
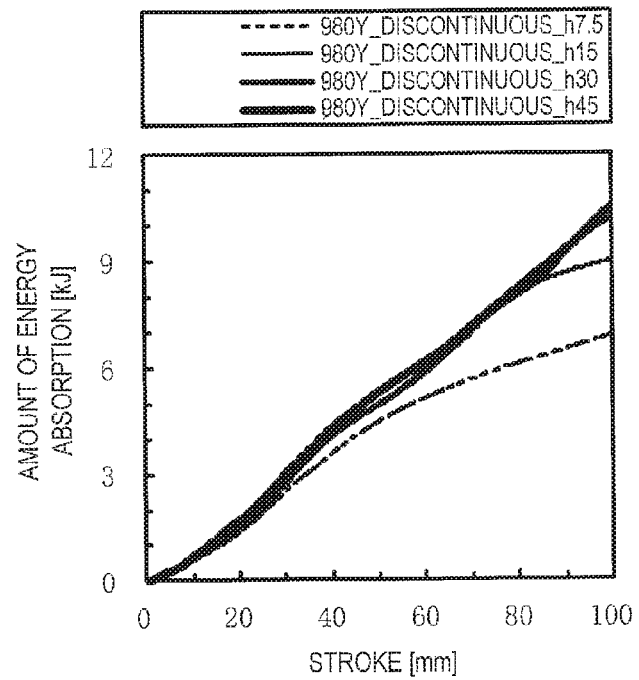
Figure 21:
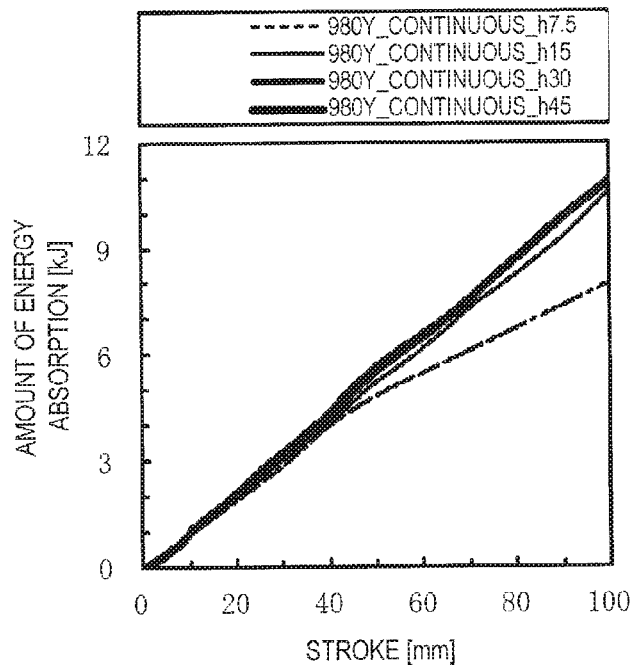

FIGS. 21 to 23 show the analytical results on the analytical models 30, 32 in which the 1.4 mm thick steel sheet of 980 MPa class in tensile strength was used. FIG. 21(*a*) is a graph showing the analytical results on amount of energy absorption vs. stroke characteristics for the analytical model 32 according to Comparative Example 2, and FIG. 21(*b*) is a graph showing the analytical results on amount of energy absorption vs. stroke characteristics for the analytical model 30 of the structural member 2 according to Example. In addition, FIG. 22 is a graph showing the analytical results on amount of energy absorption vs. groove depth characteristics at a displacement stroke of 100 mm for each of the analytical model 30 of the structural member 2 according to Example and the analytical model 32 of Comparative Example 2.

Figure 24:
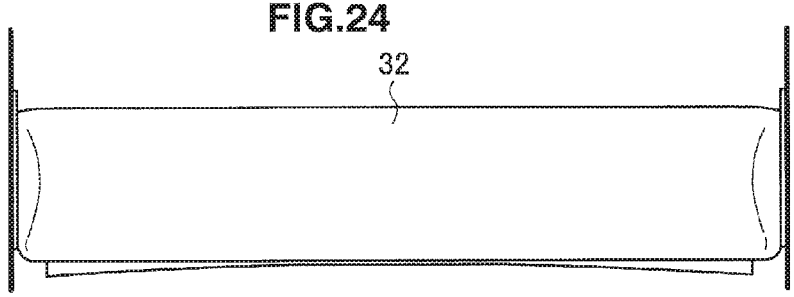
Figure 24:
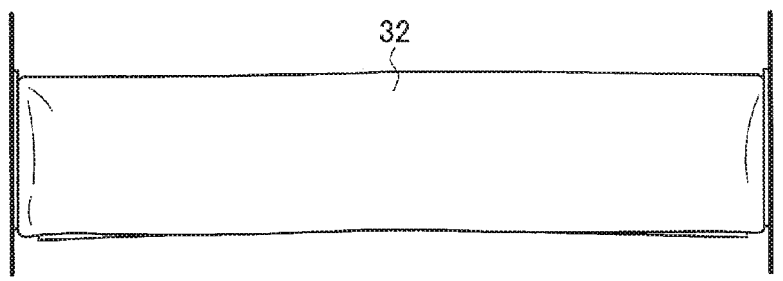
Figure 24:
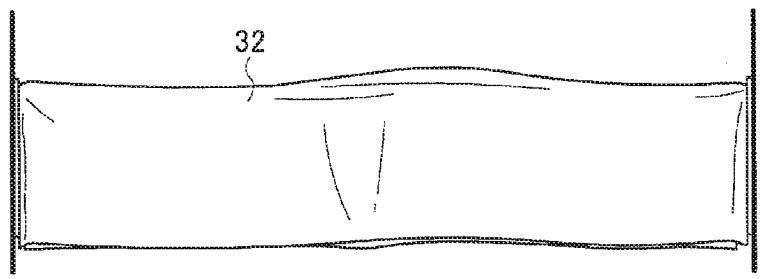
Figure 24:
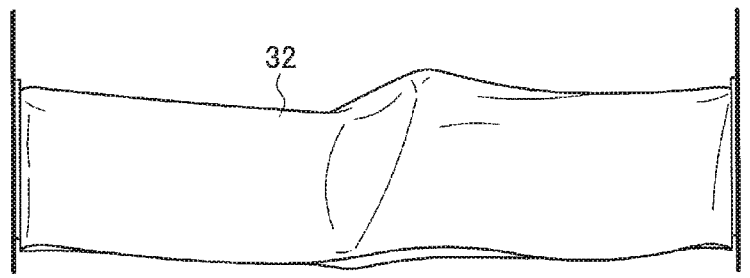
Figure 24:
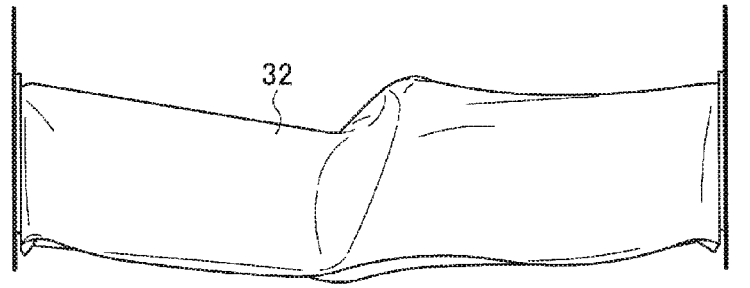
Figure 25:
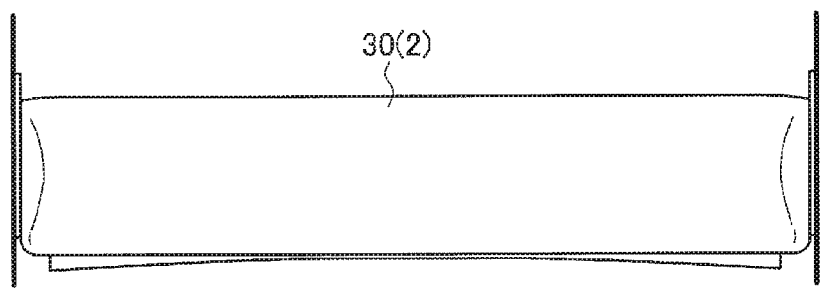
Figure 25:
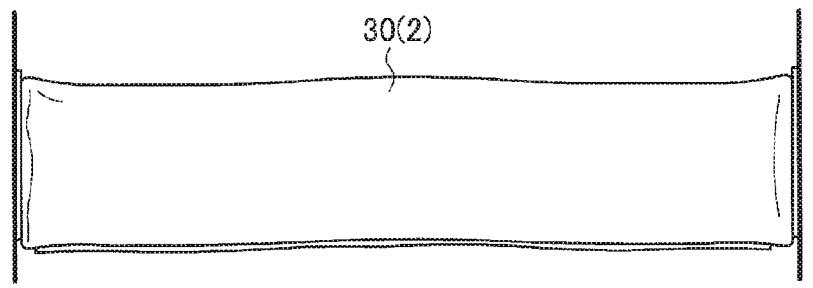
Figure 25:
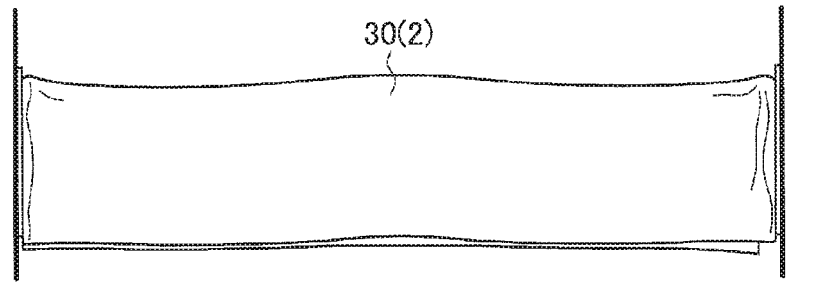
Figure 25:
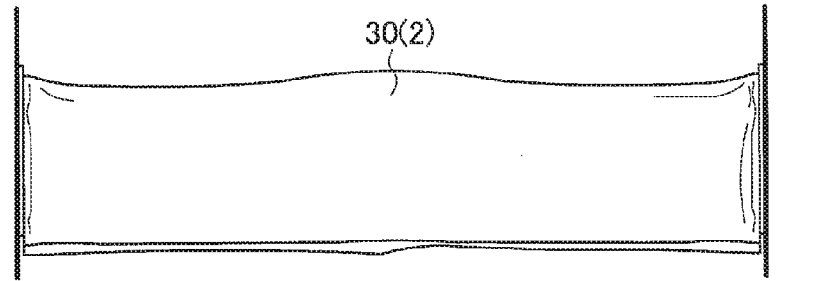
Figure 25:
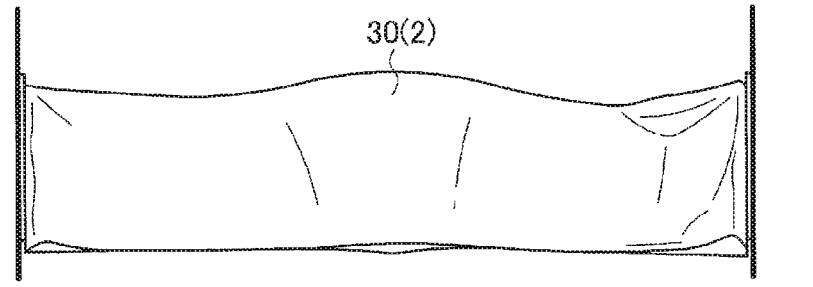

In addition, FIG. 23 is a graph showing the analytical results on normalized amount of energy absorption per unit cross sectional area vs. groove depth characteristics at a displacement stroke of 100 mm for each of the analytical model 30 of the structural member 2 according to Example and the analytical model 32 of Comparative Example 2. The normalized amount of energy absorption per unit cross sectional area represents the value that is obtained as follows: an amount of energy absorption per unit cross sectional area at a displacement stroke of 100 mm is divided by the amount of energy absorption per unit cross sectional area for the analytical model 32 of Comparative Example 2 at a groove depth of 7.5 mm and at a displacement stroke of 100 mm, and then the obtained result is multiplied by 100. Further, FIG. 24 and FIG. 25 are schematic views showing deformation, with respect to displacement stroke (10 to 50 mm), of the analytical model 32 of Comparative Example 2 and the analytical model 30 of the structural member 2 according to Example.

As shown in FIG. 21, when the 1.4 mm thick steel sheet of 980 MPa class in tensile strength is used, the analytical model 30 of the structural member 2 according to Example also exhibits higher amounts of energy absorption (kJ) than those of the analytical model 32 of Comparative Example 2 over the period until the displacement stroke reaches 100 mm. Moreover, an increase effect on the amount of energy absorption is conspicuously shown as compared to the case using the 1.4 mm thick steel sheet of 340 MPa class in tensile strength. Consequently, the structural member 2 according to Example provides a higher improvement effect on the energy absorption efficiency as the strength of the forming material 14 increase.

In addition, as shown in FIG. 22, the analytical model 30 of the structural member 2 according to Example exhibits a higher amount of energy absorption (kJ) at every groove depth h at a displacement stroke of 100 mm than that of the analytical model 32 of Comparative Example 2. Further, the analytical model 30 of the structural member 2 according to Example exhibits higher amounts of energy absorption at a displacement stroke of 100 mm (kJ) from the state in which the groove depth h is smaller.

Moreover, as shown in the graph in FIG. 23 in which the influence of the perimeter length of each analytical model 30, 32 is eliminated, the analytical model 32 of Comparative Example 2 does not exhibit an increase in the energy absorption efficiency (%) at a displacement stroke of 100 mm when the depth h of the groove 8 is small. Furthermore, the analytical model 32 of Comparative Example 2 does not show a marked increase in the energy absorption efficiency when the depth h of the groove 8 is made larger. This is due to the fact that the analytical model 32 of Comparative Example 2 does not have the ridge flanges 50*a*, 50*b* so that when the ridges of the groove 8 is stressed hard in the middle stage of collision in which the displacement stroke exceeds 40 mm, the restraint at the ridge ends becomes loose and the structural member buckles, as shown in FIG. 24.

In contrast, the energy absorption efficiency (%) at a displacement stroke of 100 mm is increased, regardless of the groove depth h, in the analytical model 30 of the structural member 2 according to Example. In addition, when the energy absorption efficiency at a displacement stroke of 100 mm is a maximum, the groove depth h is smaller for the analytical model 30 of the structural member 2 according to Example than that for the analytical model 32 of Comparative Example 2. This is due to the fact that the analytical model 30 of the structural member 2 according to Example has the ridge flanges 50*a*, 50*b* so that the buckling behavior of the structural member 2 becomes stable in the middle stage of collision in which the displacement stroke exceeds 40 mm, as shown in FIG. 25.

Incidentally, the groove depth $H_0$ in FIG. 23, with which the energy absorption efficiency at a displacement stroke of 100 mm becomes a maximum, can be expressed in the above described formula (2). In addition, when the groove depth h is in the range of $0.2 \times H_0$ to $3.0 \times H_0$ in terms of above $H_0$ as shown in the above described formula (1), the energy absorption efficiency at a displacement stroke of 100 mm becomes large as compared to the analytical model 32 according to Comparative Example 2.

REFERENCE SIGNS LIST

1 joined structure
2 structural member (first member)
3 second member
4 top plate
4*a*, 4*b* ridge
5*a*, 5*b* vertical wall
6*a*, 6*b* curved section
7*a*, 7*b* flange
8 groove
9*a*, 9*b*, 9*c* outward continuous flange
10 press-forming apparatus
11 punch
11*b* groove-forming part
12 die
13 pad (ridge pad)

13a bump part
13b top plate pressing part
13c ridge-pressing part
14 forming material
15 pad known in the art
20 press-forming apparatus
30, 31, 32 analytical model
40 intermediate product
45 closing plate
50a, 50b ridge flange
50c outward flange (groove bottom flange)
55 notch
h groove depth
w groove width

The invention claimed is:

1. A structural member for an automotive body, the structural member consisting of a press-formed product made of a steel sheet, the press-formed product extending in a predetermined direction, including a top plate, a ridge continuing to the top plate, and a vertical wall continuing to the ridge, and having a gutter-shaped cross section intersecting the predetermined direction, the structural member comprising:
   at least one groove formed in the top plate, and extending in the predetermined direction; and
   an outward flange formed at least in a region of the ridge in an end in the predetermined direction,
   wherein a depth (h) of the groove, a width (w) of the groove, and a sheet thickness (t) of the steel sheet in the end in the predetermined direction satisfy a relation: $0.2 \times H_0 \leq h \leq 3.0 \times H_0$, where $H_0 = (0.037t - 0.25) \times w - 5.7t + 29.2$.

2. The structural member for the automotive body according to claim 1, wherein the steel sheet is a high-tensile steel sheet having a tensile strength of 390 MPa or more.

3. The structural member for the automotive body according to claim 1, wherein the steel sheet is a high-tensile steel sheet having a tensile strength of 590 MPa or more.

4. The structural member for the automotive body according to claim 1, wherein the steel sheet is a high-tensile steel sheet having a tensile strength of 980 MPa or more.

5. The structural member for the automotive body according to claim 1, wherein the outward flange is an outward continuous flange continuously formed in a region over the ridge and at least a part of each of the top plate and the vertical wall, in the end in the predetermined direction.

6. The structural member for the automotive body according to claim 1, wherein the structural member includes the outward flange in a region of the groove in an end in the predetermined direction.

7. The structural member for the automotive body according to claim 1, wherein the structural member for the automotive body is joined to another member via the outward flange by resistance spot welding, penetration laser welding, arc fillet welding, adhesion with an adhesive, or a combination thereof.

8. A structural member for an automotive body, the structural member comprising a press-formed product made of a steel sheet, the press-formed product extending in a predetermined direction, including a top plate, a ridge continuing to the top plate, and a vertical wall continuing to the ridge, and having a gutter-shaped cross section intersecting the predetermined direction, the structural member comprising:
   at least one groove formed in the top plate, and extending in the predetermined direction; and
   an outward flange formed at least in a region of the ridge in an end in the predetermined direction,
   wherein a depth (h) of the groove, a width (w) of the groove, and a sheet thickness (t) of the steel sheet in the end in the predetermined direction satisfy a relation: $0.2 \times H_0 \leq h \leq 3.0 \times H_0$, where $H_0 = (0.037t - 0.25) \times w - 5.7t + 29.2$.

\* \* \* \* \*